United States Patent
Artan et al.

(10) Patent No.: US 8,212,695 B2
(45) Date of Patent: Jul. 3, 2012

(54) GENERATING A LOG-LOG HASH-BASED HIERARCHICAL DATA STRUCTURE ASSOCIATED WITH A PLURALITY OF KNOWN ARBITRARY-LENGTH BIT STRINGS USED FOR DETECTING WHETHER AN ARBITRARY-LENGTH BIT STRING INPUT MATCHES ONE OF A PLURALITY OF KNOWN ARBITRARY-LENGTH BIT STRINGS

(75) Inventors: Sertac Artan, Brooklyn, NY (US); H. Jonathan Chao, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 448 days.

(21) Appl. No.: 12/366,516

(22) Filed: Feb. 5, 2009

(65) Prior Publication Data

US 2010/0199066 A1    Aug. 5, 2010

(51) Int. Cl.
*H03M 7/00*    (2006.01)

(52) U.S. Cl. .......................... 341/106; 341/107

(58) Field of Classification Search ................ 341/50, 341/51, 106, 107, 87
See application file for complete search history.

(56) References Cited

U.S. PATENT DOCUMENTS

| | | | |
|---|---|---|---|
| 4,907,194 A * | 3/1990 | Yamada et al. | 365/49.17 |
| 5,485,526 A | 1/1996 | Tobin | |
| 6,121,901 A * | 9/2000 | Welch et al. | 341/51 |
| 7,017,021 B2 * | 3/2006 | Gupta et al. | 711/169 |
| 7,403,136 B2 | 7/2008 | De La Cruz et al. | |
| 7,868,792 B2 | 1/2011 | Artan et al. | |

\* cited by examiner

*Primary Examiner* — Brian Young
(74) *Attorney, Agent, or Firm* — John C. Pokotylo; Straub & Pokotylo

(57) ABSTRACT

Generating and using a high-speed, scalable and easily updateable data structures are described. The proposed data structure provides minimal perfect hashing functionality while intrinsically supporting low-cost set-membership queries. In other words, in some embodiments, it provides at most one match candidate in a set of known arbitrary-length bit strings that is used to match the query.

23 Claims, 14 Drawing Sheets

GENERATING A LOG-LOG HASH-BASED HIERARCHICAL DATA STRUCTURE ASSOCIATED WITH A PLURALITY OF KNOWN ARBITRARY-LENGTH BIT STRINGS USED FOR DETECTING WHETHER AN ARBITRARY-LENGTH BIT STRING INPUT MATCHES ONE OF A PLURALITY OF KNOWN ARBITRARY-LENGTH BIT STRINGS

§1. BACKGROUND OF THE INVENTION

§1.1 Field of the Invention

The present invention concerns matching an arbitrary-length bit string with one of a number of known arbitrary length bit strings. The present invention may be used for network intrusion detection and prevention. In particular, the present invention concerns a novel data structure—namely, a trie-bitmap content analyzer (TriBiCa) operating with a highly memory-efficient LogLog hashing method—which provides minimum perfect hashing functionality while supporting low-cost set membership queries. By using such a data structure, matching can be checked at high speed.

§1.2 Background Information

To ensure reliable and secure services, network security has grown increasingly important in the Internet. Deep Packet Inspection ("DPI") has been widely used in the Network Intrusion Detection and Prevention Systems ("NIDPSs") to detect viruses or worms. (See, e.g., Sourcefire 3d. [Online]. Available: http://www.sourcefire.com, Fortinet. [Online]. Available: http://www.xilinx.com.) The DPI examines every single byte of each incoming packet and matches them against a set of predefined malicious patterns. To implement the DPI at 40 Gbit/s or even 100 Gbit/s cost effectively and scalable to a few tens of thousands or millions of keys is still very challenging. To achieve the above objective, it is presently required to include all the patterns on the chip so as to take advantage of parallelism/pipelining operations.

Minimal Perfect Hash Functions ("MPHFs") has been used, during the query, to access the pattern (also referred to as signature) in the hash table to compare with the incoming packet. The MPHF guarantees that there will be only one signature stored at each hashed location so that it just needs to perform one exact match operation (in other words, there is no hash collision). In addition, it also achieves the minimum hash table size by equating the table size to the number of keys. (See, e.g., P. E. Black, "Minimal Perfect Hashing," in *Dictionary of Algorithms and Data Structures*. U.S. National Institute of Standards and Technology, July 2006. [Online]. Available: http://www.nist.gov/dads/HTML/minimalPerfectHash.html.)

In the paper N. S. Artan and H. J. Chao, "TriBiCa: Trie Bitmap Content Analyzer for High-Speed Network Intrusion Detection," in 26*th Annual IEEE Conference on Computer Communications (INFOCOM)*, 2007, pp. 125-133, an on-chip trie-based framework called TriBiCa (Trie Bitmap Content Analyzer) is proposed to implement the MPHF on a field-programmable-gate-array (FPGA) chip at a speed of 10 Gbit/s (See, e.g., N. S. Artan, R. Ghosh, Y. Guo, and H. J. Chao, "A 10-Gbps High-Speed Single-Chip Network Intrusion Detection and Prevention System," in 50*th Annual IEEE Global Communications Conference, GLOBECOM*2007, Washington, D.C., November 2007.)

§1.2.1 Previous Approaches and Perceived Limitations of Such Approaches

For DPI in NIDPS, the data structure to store the intrusion signatures database should balance the requirements of high-speed, low-cost and easy update. DPI approaches in software NIDPSs such as Snort (See [Online]. Available: http://www.snort.org.) and the article V. Paxson, "Bro: A System for Detecting Network Intruders in Real-Time," *Computer Networks*, vol. 31, pp. 2435-2463, 1999.) are very flexible and support detection of sophisticated intrusions. However, they are not scalable for high speeds since they run on general-purpose hardware, which is intrinsically slow and has limited parallelism. Hence, hardware approaches are preferred for certain applications.

DPI approaches on hardware can broadly be classified into two architectures based on their signature storage media: (1) off-chip memory (See, e.g., F. Yu, T. Lakshman, and R. Katz, "Gigabit Rate Pattern-Matching using TCAM," in *Int. Conf. on Network Protocols (ICNP)*, Berlin, Germany, October 2004 and H. Song and J. Lockwood, "Multi-pattern Signature Matching for Hardware Network Intrusion Detection Systems," in 48*th Annual IEEE Global Communications Conference, GLOBECOM*2005, St. Louis, Mo., November-December 2005.) and (2) on-chip memory and/or logic blocks (See, e.g., C. Clark and D. Schimmel, "Scalable Pattern Matching for High-Speed Networks," in *IEEE Symposium on Field-Programmable Custom Computing Machines (FCCM)*, Napa, Calif., 2004, pp. 249-257, Y. H. Cho and W. H. Mangione-Smith, "Fast Reconfiguring Deep Packet Filter for 1+ Gigabit Network," in *FCCM,* 2005, pp. 215-224, Z. K. Baker and V. K. Prasanna, "High-Throughput Linked-Pattern Matching for Intrusion Detection Systems," in *Proc. of the First Annual ACM Symposium on Architectures for Networking and Communications Systems*, Princeton, N.J., 2005, pp. 193-202, J. Moscola, J. Lockwood, R. P. Loui, and M. Pachos, "Implementation of a Content-Scanning Module for an Internet Firewall," in *FCCM,* 2003, pp. 31-38, I., Sourdis, D. Pnevmatikatos, S. Wong, and S. Vassiliadis, "A Reconfigurable Perfect-Hashing Scheme for Packet Inspection," in *Proc.* 15*th International Conference on Field Programmable Logic and Applications (FPL* 2005), August 2005, pp. 644-647, L. Tan and T. Sherwood, "Architectures for Bit-Split String Scanning in Intrusion Detection," *IEEE Micro*, vol. 26, no. 1, pp. 110-117, January-February 2006, G. Papadopoulos and D. N. Pnevmatikatos, "Hashing+Memory=Low Cost, Exact Pattern Matching," in *Proc.* 15*th International Conference on Field Programmable Logic and Applications (FPL)*, August 2005, pp. 39-44, and Y. Lu, B. Prabhakar, and F. Bonomi, "Perfect Hashing for Network Applications," in *IEEE Symposium on Information Theory*, Seattle, Wash., 2006, pp. 2774-2778). Architectures using off-chip memory for signature storage are fundamentally limited by the off-chip memory throughput and additional cost of memory chips. As a result of these limitations of the off-chip storage, on-chip storage has gained attention.

For the partitioning operation, BARTS (See, e.g., J. van Lunteren, "Searching Very Large Routing Tables in Wide Embedded Memory," *Global Telecommunications Conference*, 2001.*GLOBECOM* '01. *IEEE*, vol. 3, 2001.), a memory-efficient route lookup scheme, chooses a particular bit as a representative bit. However, BARTS selects those bits from the input keys, so uniformity of the input is critical for BARTS to succeed. Thus, it would be useful to provide a partitioning scheme that avoids the uniformity requirement. The Perfect Hash Function proposed by Sourdis et al. (See, e.g., I. Sourdis, D. Pnevmatikatos, S. Wong, and S. Vassiliadis, "A Reconfigurable Perfect-Hashing Scheme for Packet Inspection," in *Proc.* 15*th International Conference on Field Programmable Logic and Applications (FPL* 2005), August 2005, pp. 644-647, I., and Sourdis, D. N. Pnevmatikatos, and S. Vassiliadis, "Scalable multigigabit pattern matching for packet inspection." *IEEE Trans. VLSI Syst.*, vol. 16, no. 2, pp.

156-166, 2008.) also uses inputs as hash keys and the hash function is hard-coded in the logic. The paper Y. Lu, B. Prabhakar, and F. Bonomi, "Perfect Hashing for Network Applications," in *IEEE Symposium on Information Theory*), Seattle, Wash., 2006, pp. 2774-2778, achieved MPHF using Bloom Filters with 8.6n-bits. However, complex computations are required to locate entries in the hash table for queries.

A goal of the present application is to provide a low-cost and space-efficient MPHF that is simple to construct and suitable for high-speed hardware implementation.

§2. SUMMARY OF THE INVENTION

Embodiments consistent with the present invention provide a high-speed, scalable, and easily updateable data structure to address these challenges. Specifically, the data structure is relatively small and its size may scale with the number of items and the average string length of items in the set. In addition, the updates can be achieved without hardware modifications.

Following the data structure, at least some embodiments consistent with the present invention provide a hardware architecture that tailors this data structure to the NIDPS. The exemplary hardware architecture fits into a fraction of a modest FPGA without the need for any external memory. More specifically, using parallel engines, the exemplary hardware architecture can provide speeds on the order of 10-Gbps throughput in the worst case on a Xilinx Virtex II Pro FPGA. If current state-of-the-art FPGAs are used, the proposed architecture can easily achieve DPI at speeds on the order of 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

§3. BRIEF DESCRIPTION OF THE DRAWINGS

Figure 5A:
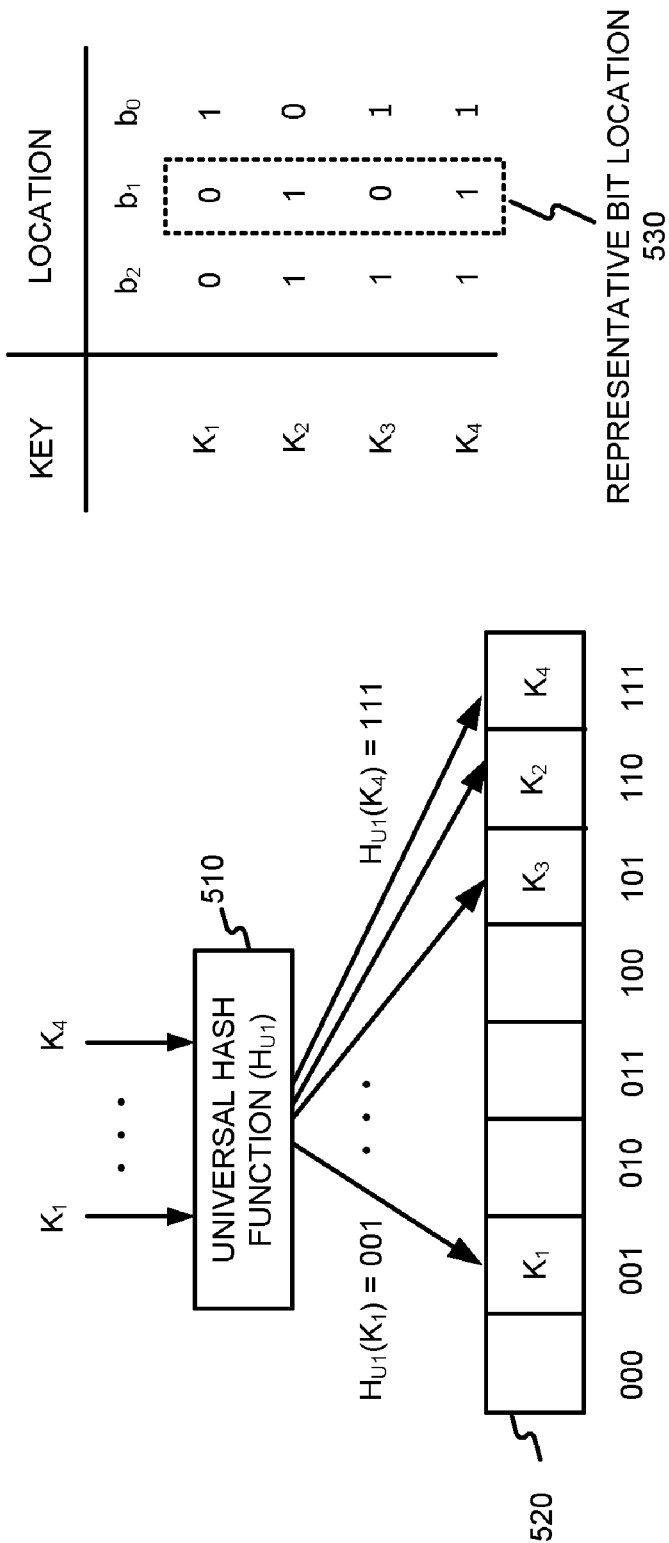
Figure 5B:
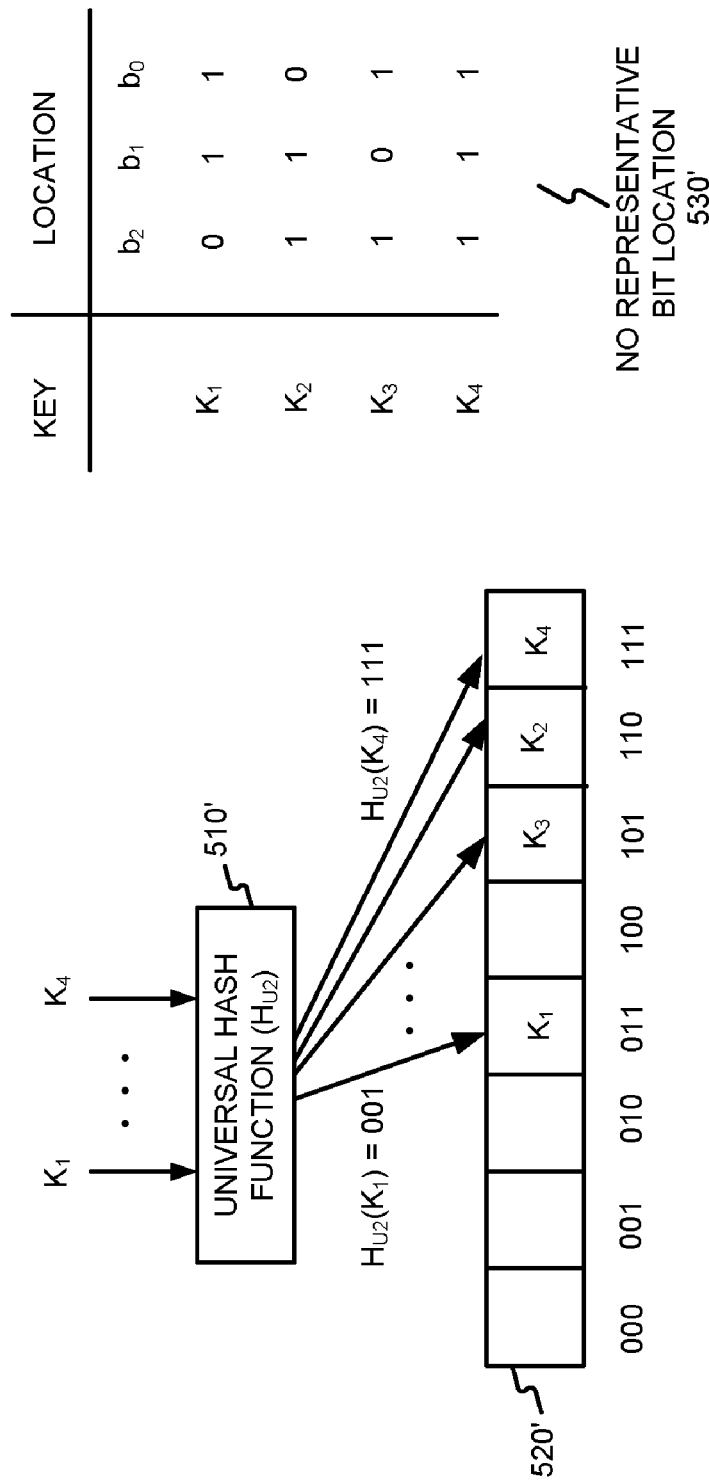

FIG. 5A illustrates an exemplary LogLog hash TriBiCa node comprising and operating with a universal hash function that allows for a representative bit location to be determined based on the LogLog hash method consistent with the present invention. FIG. 5B illustrates an exemplary LogLog hash TriBiCa node comprising and operating with a universal hash function that does not allow for a representative bit location to be determined based on the LogLog hash method consistent with the present invention.

Figure 6A:
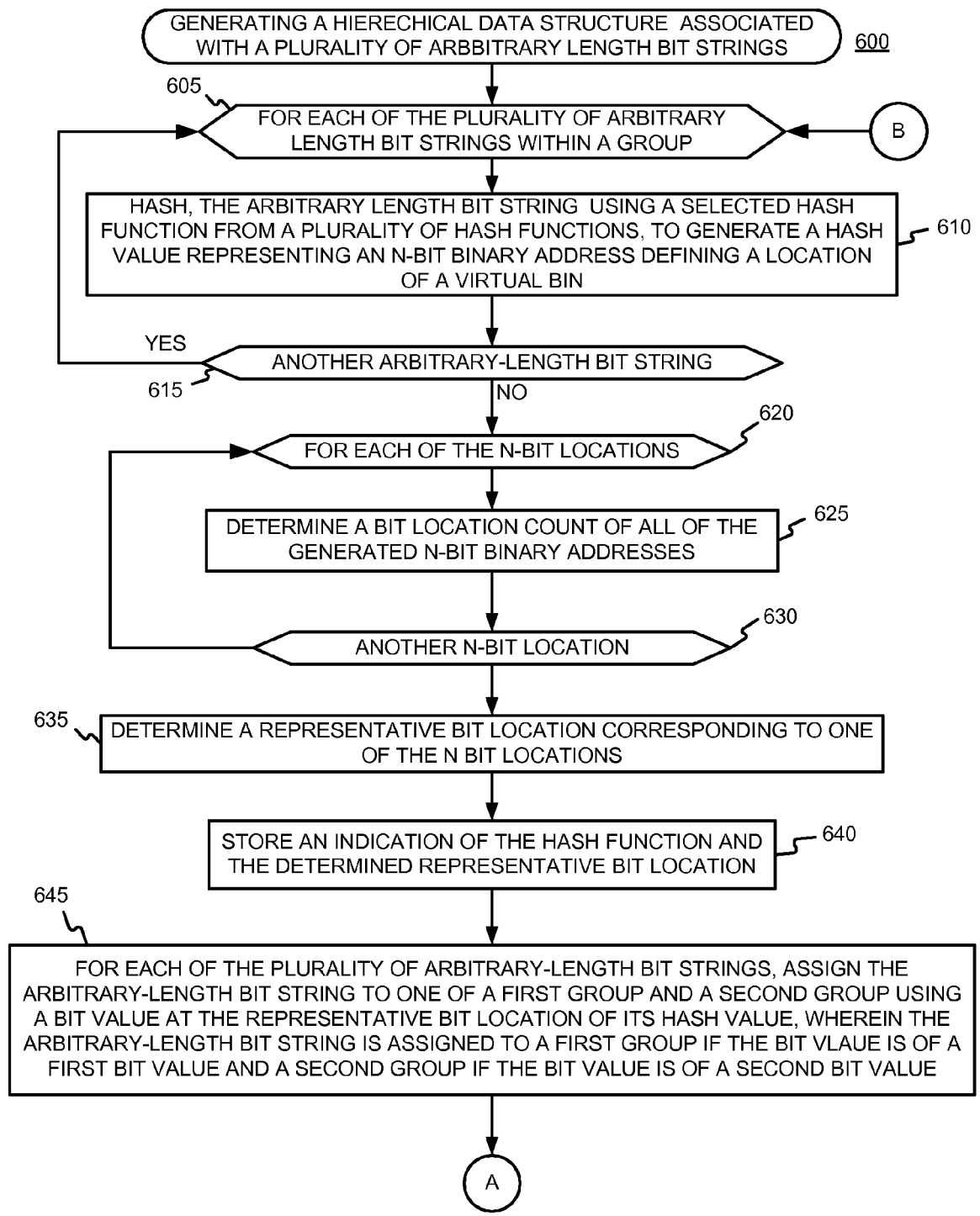
Figure 6B:
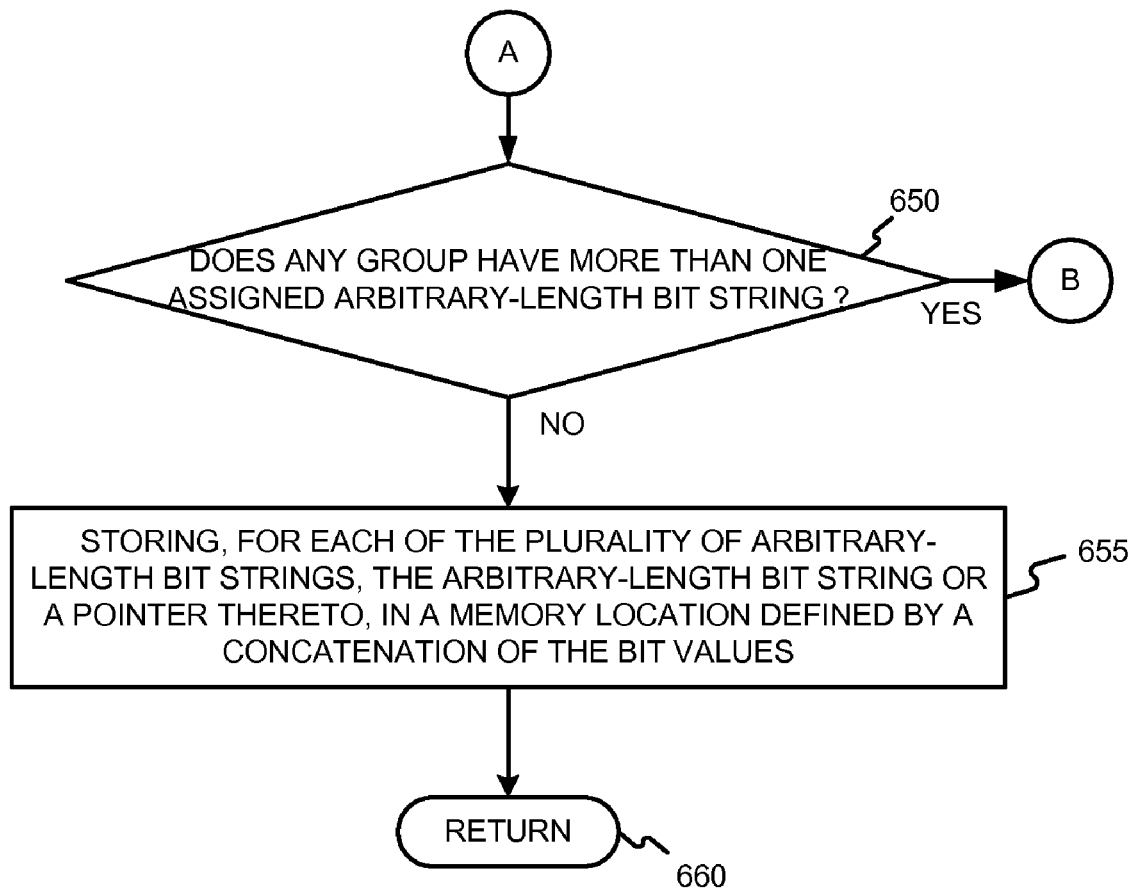

FIGS. 6A and 6B, taken collectively, are a flow diagram of an exemplary method which may be used to generate a hierarchical data structure associated with a plurality of arbitrary-length bit strings, in a manner consistent with the present invention.

Figure 7:
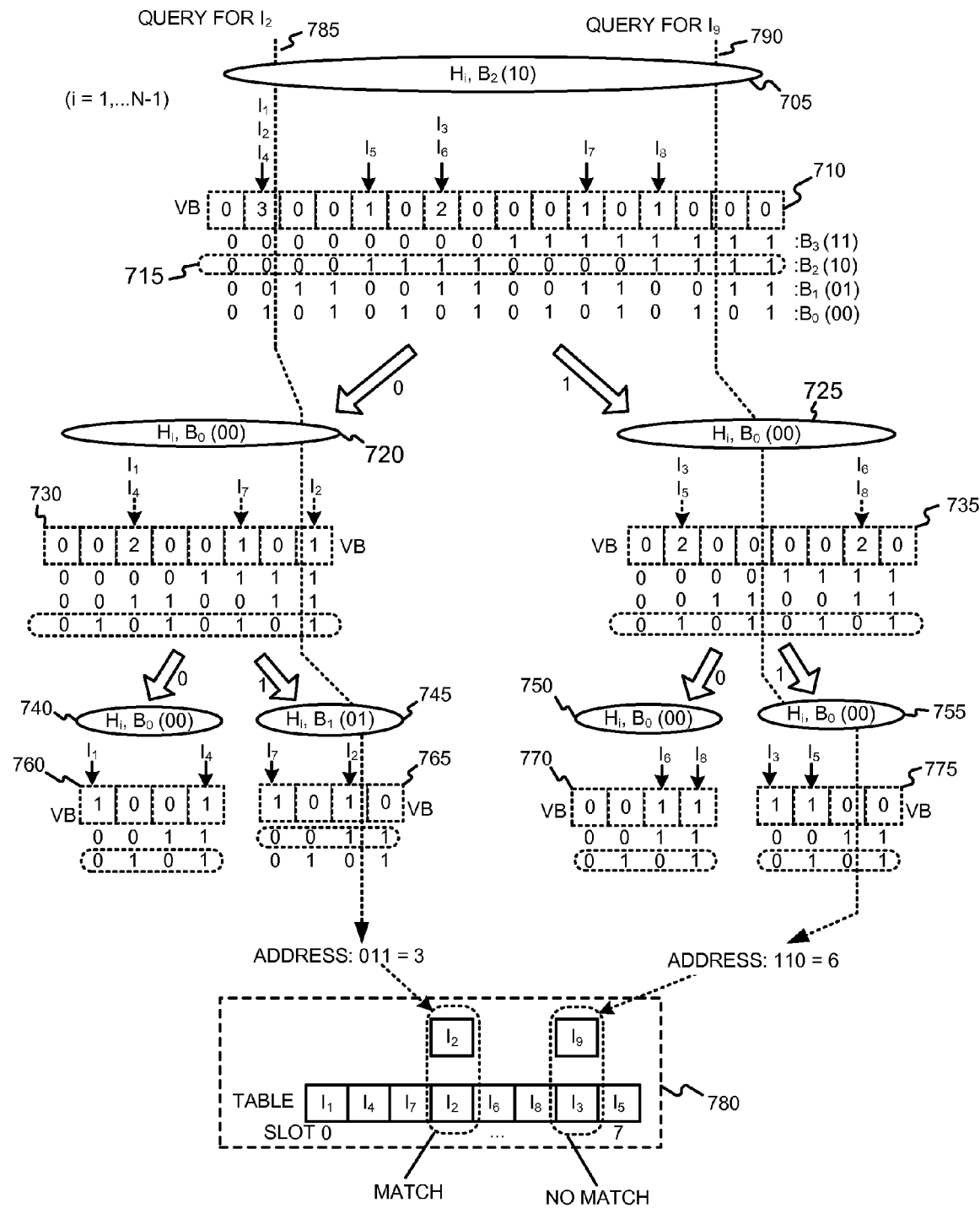

FIG. 7 is an example, illustrating generating and querying an exemplary LogLog hash TriBiCa trie structure, consistent with the present invention.

Figure 8:
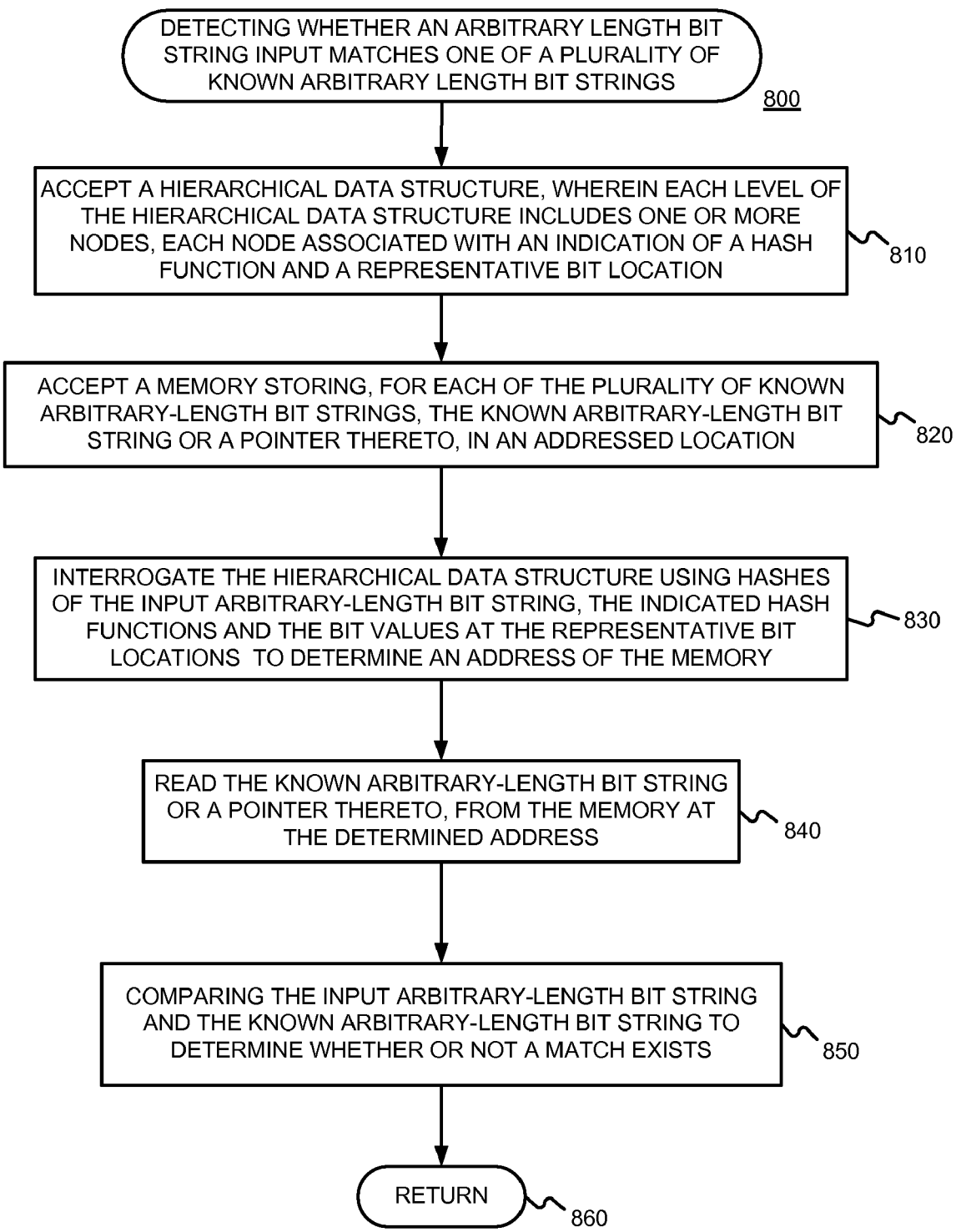

FIG. 8 is a flow diagram of an exemplary method for detecting whether an arbitrary-length bit string input matches one of a plurality of known arbitrary-length bit strings, in a manner consistent with the present invention.

Figure 9A:
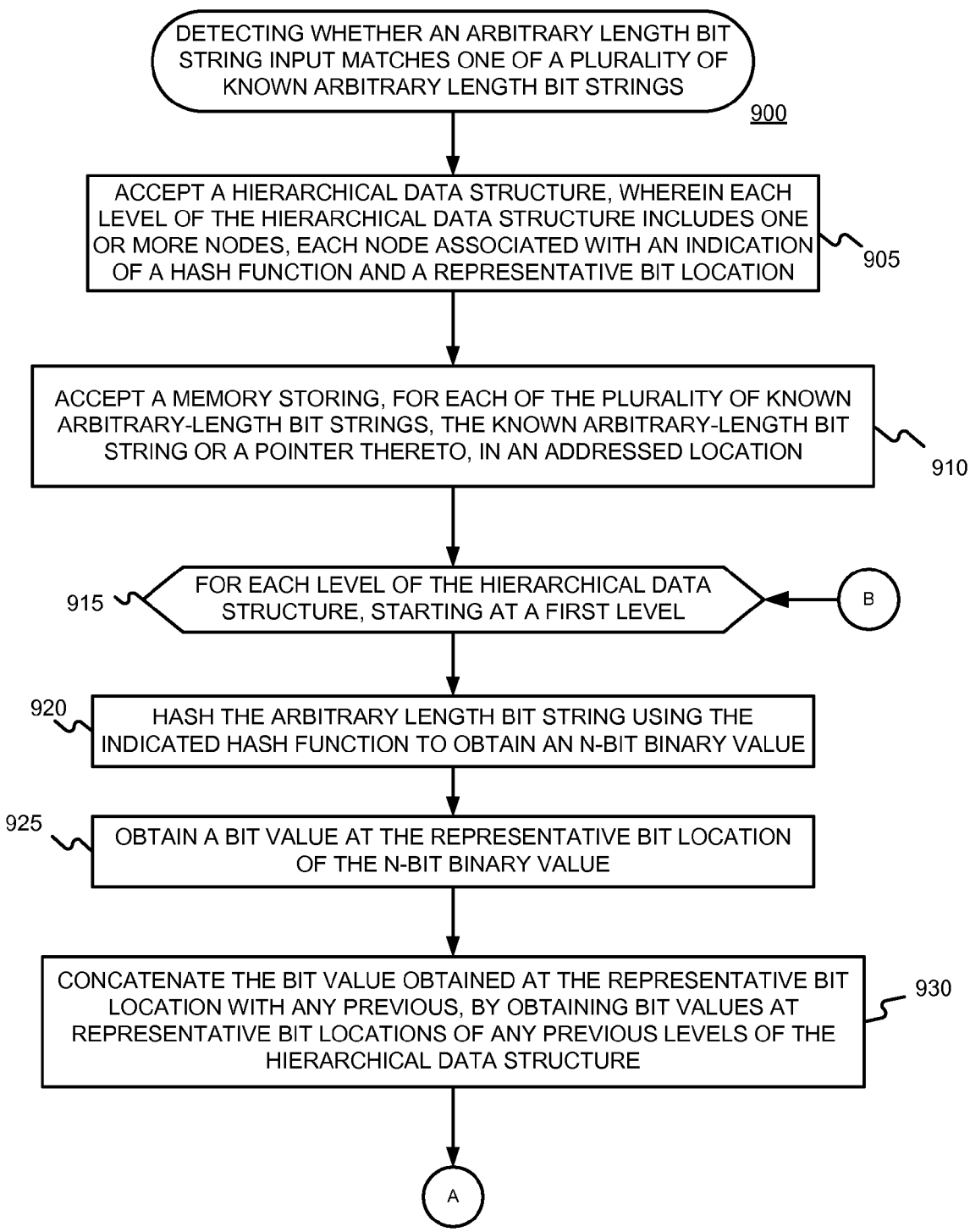
Figure 9B:
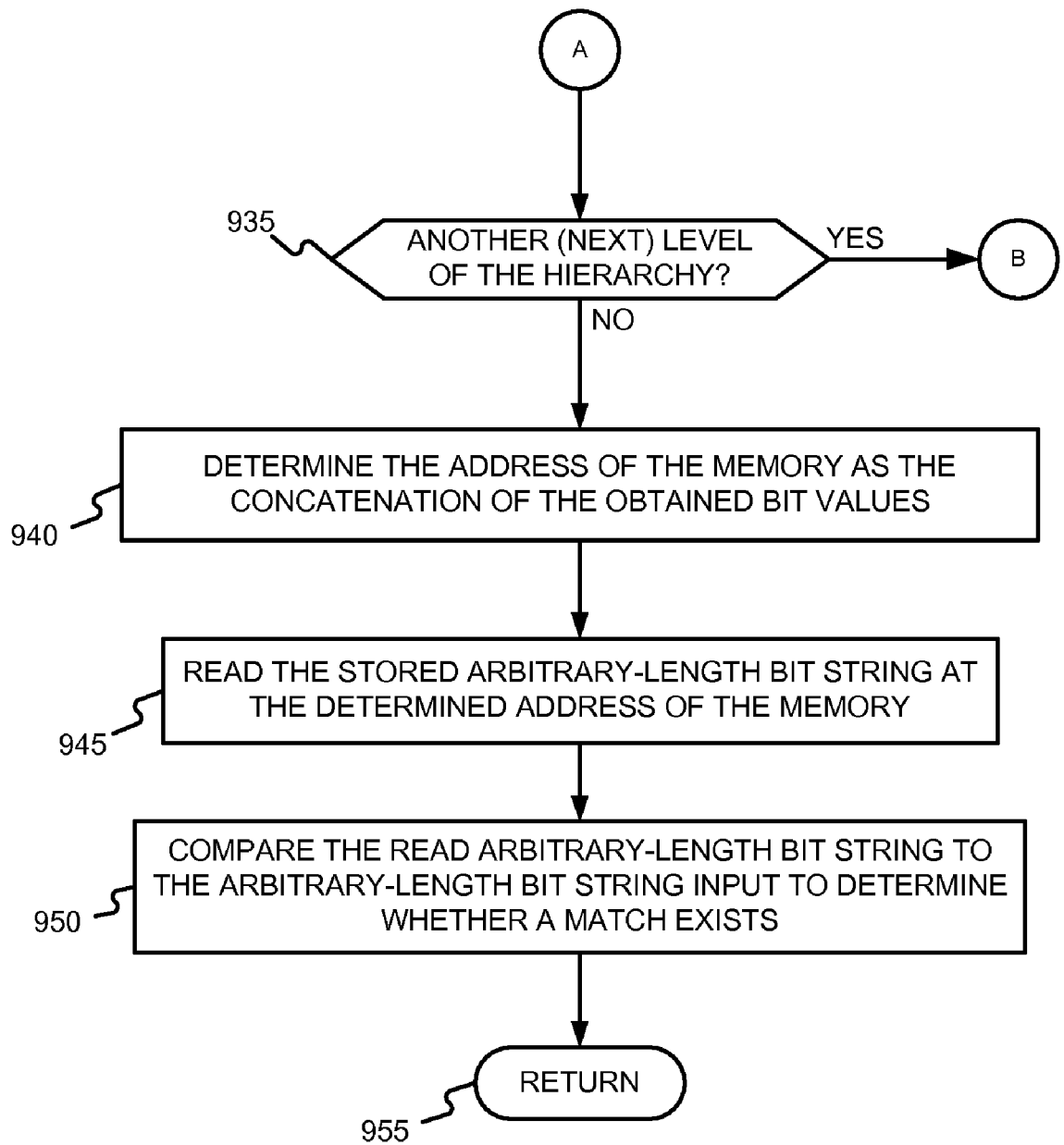

FIGS. 9A and 9B taken collectively, are a flow diagram of an exemplary method for detecting whether an arbitrary-length bit string input matches one of a plurality of known arbitrary-length bit strings in a manner consistent with the present invention.

Figure 10:
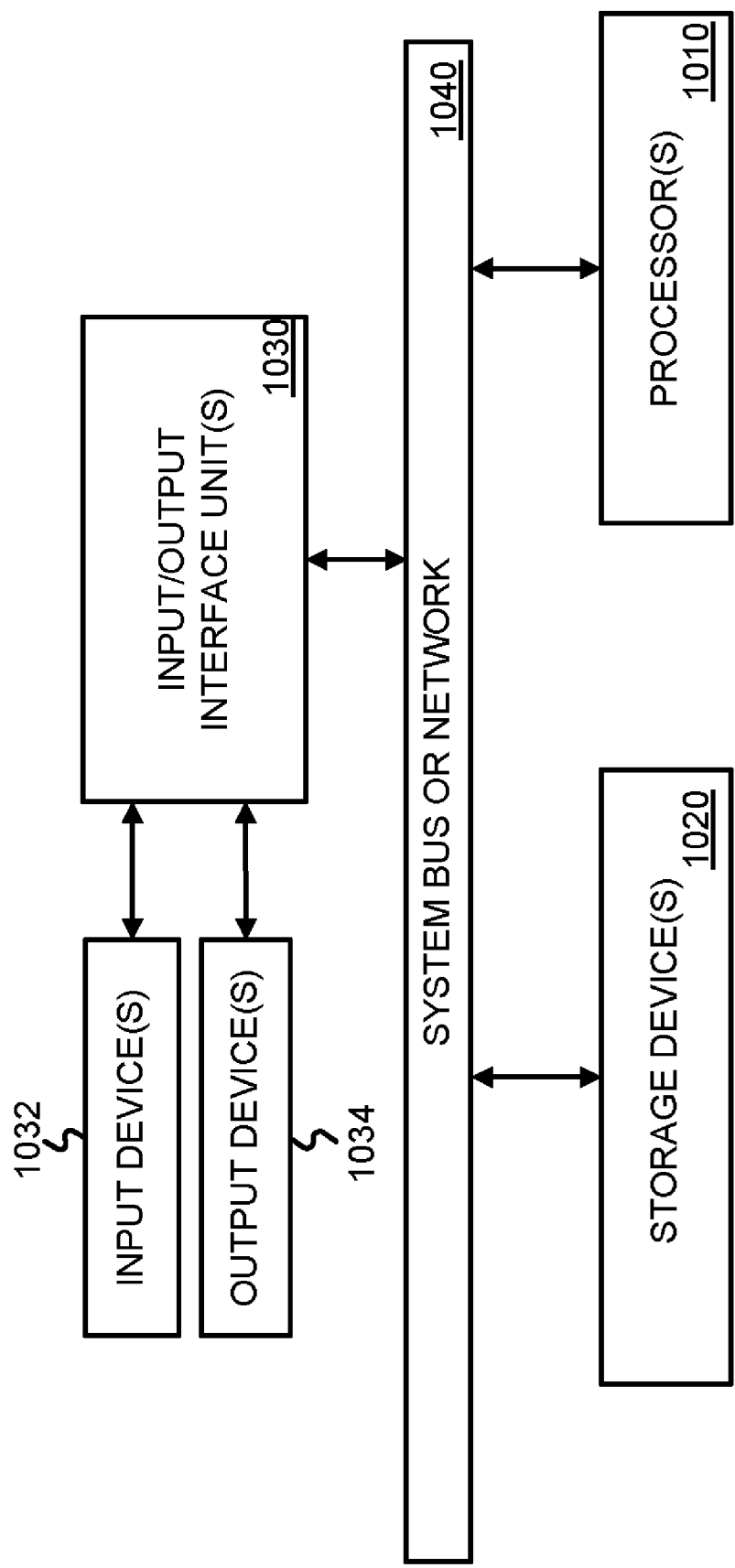

FIG. 10 is a block diagram of an exemplary apparatus that may perform various operations, and store various information generated and/or used by such operations, in a manner consistent with the present invention.

Figure 11:
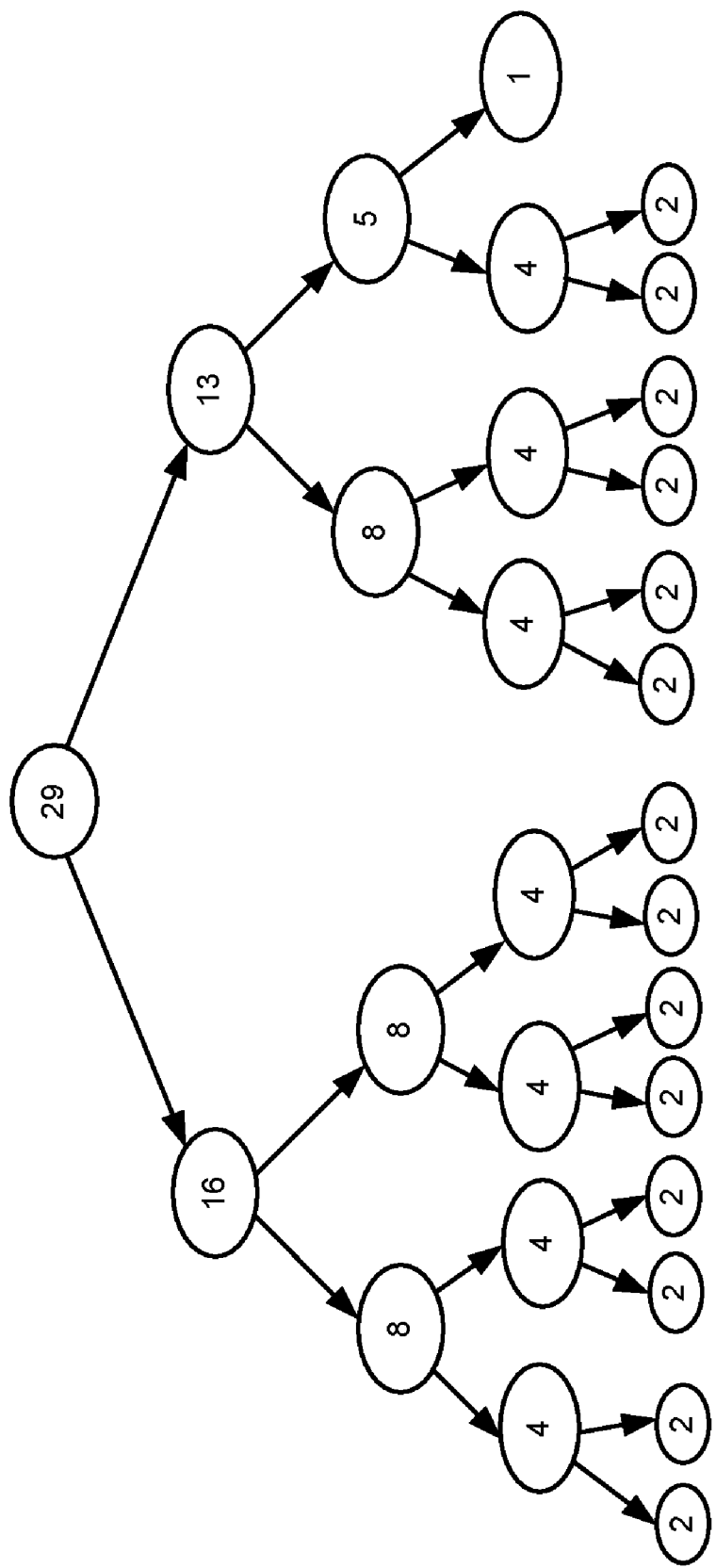

FIG. 11 illustrates an exemplary LogLog hash TriBiCa binary trie structure when the number of items in its root node is not a power of two, in a manner consistent with the present invention.

§4. DETAILED DESCRIPTION

The present invention may involve novel methods, apparatus, message formats, and/or data structures to facilitate a high-speed architecture for determining whether or not an arbitrary-length bit string matches one of a number of known arbitrary-length bit strings. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Figure 1:
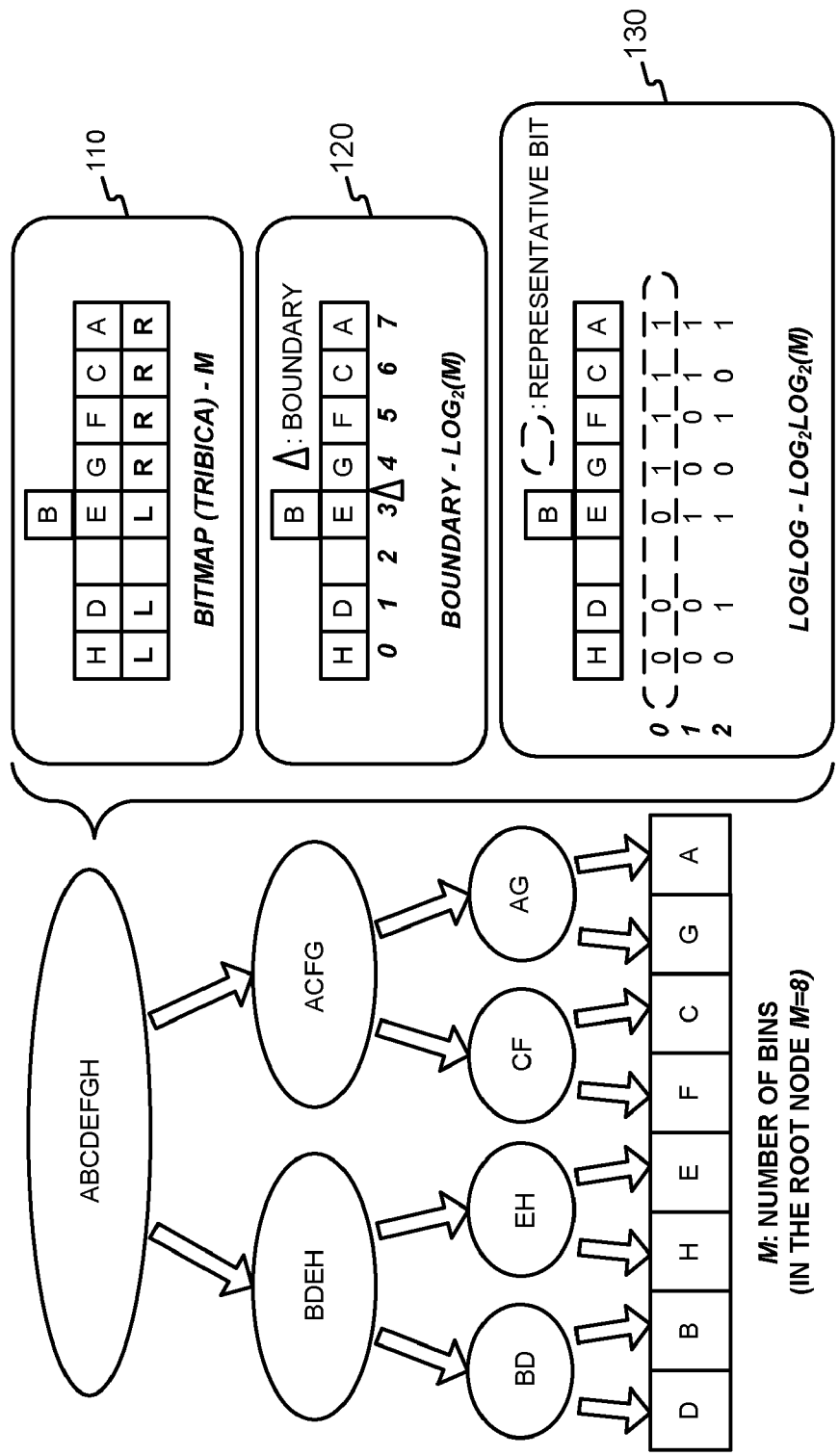
FIG. 1 illustrates an example of a trie based minimal perfect hash data structure along with three partitioning schemes.

FIG. 1 shows an exemplary TriBiCa structure with three different partitioning schemes. A simplified trie structure is illustrated in the lefthand side of the figure. TriBiCa starts with n "items" (or "keys") at the root node of a trie and it partitions the keys into two sets (each set with n/2 keys). Note that "keys" or "items" are used interchangeably and are meant to have the same meaning in the following paragraphs for purposes of explanation and illustration. In the example, the root node contains eight keys (n=8) [ABCDEFGH]. The eight keys are partitioned into two equal-sized sets in child nodes. Each child node has four keys (BDEH) and (ACFG). This operation is repeated until leaf nodes are reached that are located in the bottom of the trie and that have only one key. As a result, an MPHF trie is constructed. Note that if the number of keys is not a power of two (e.g., 5), the keys might be pushed into the left nodes. (That is, some right nodes will be empty.) There is no need to store the empty nodes on the right, so the trie still provides an MPHF.

To query for a key, the trie is traversed until a single candidate key is located at a leaf node. When the single key is found, only one comparison is needed (That is, the queried key and the candidate key are compared.) to decide whether the queried key is actually the same as the candidate key. Although each query traverses $\log_2(n)$ levels, since the architecture can be fully pipelined, the throughput can be one query response per clock cycle.

The right-hand side of FIG. 1 illustrates three different approaches for node partitioning; the root node is used as an example. In the first approach bitmaps 110 are used to represent the destination of keys. (See, e.g., N. S. Artan and H. J. Chao, "TriBiCa: Trie Bitmap Content Analyzer for High-Speed Network Intrusion Detection," in 26*th Annual IEEE Conference on Computer Communications (INFOCOM)*, 2007, pp. 125-133, and N. S. Artan, R. Ghosh, Y. Guo, and H. J. Chao, "A 10-Gbps High-Speed Single-Chip Network Intrusion Detection and Prevention System," in 50*th Annual IEEE Global Communications Conference, GLOBECOM* 2007, Washington, D.C., November 2007.) An L depicts a destination to a left child node, and an R depicts a destination to a right child node. To allocate those input keys into the bins, a universal hash function (See, e.g., J. L. Carter and M. N. Wegman, "Universal classes of hash functions (extended abstract)," in *STOC '77: Proceedings of the ninth annual ACM symposium on Theory of computing*. New York, N.Y., USA: ACM, 1977, pp. 106-112.) is used to distribute keys evenly. Let m be the number of bins. Then, this approach requires m bits for m bins, since bitmaps are used. A second approach uses a memory-efficient partitioning method, called a Boundary Hash 120 to replace the bitmaps. (See, e.g., N. S. Artan, M. Bando, and H. J. Chao, "Boundary Hash for Memory-Efficient Deep Packet Inspection," in *IEEE International Conference on Communications (ICC* 2008), Beijing, China, May 2008.) The Boundary Hash only keeps information of the boundary bin to partition a node. (The third bin is the boundary bin in FIG. 1.) Hence, the memory requirement drops from m to $\log_2(m)$.

Embodiments consistent with the present invention provide an even more memory-efficient approach named LogLog Hash 130. In 130 of FIG. 1, the left-most virtual bin has address 0 ("000" in binary notation), and the right-most virtual bin has address m−1=7 ("111" in binary notation). In this example, the most significant bit is selected as a representative bit (circled by a dashed line—bit location 0 in the figure.). Since, $(\log_2(m))=3$ bits are required to distinguish eight bins (m), and one bit is chosen out of the three bits as the representative bit. To distinguish between these three bits, $(\lceil \log2(\log2(m))\rceil)=2$ bits are required to store the representative bit. LogLog Hash partitioning is discussed in greater detail below.

§4.1 Exemplary Data Structure

The data structure of an exemplary LogLog hash-based Trie Bitmap Content Analyzer ("TriBiCa") is now described. Suppose, a set S with n items is stored in a table with exactly n slots and each slot stores a single item from S. The objective is to design a data structure that can represent this set S and respond to a membership query on S by (1) pointing to a single possible match candidate in S (i.e., pointing to a single table slot) without any prior exact matching between the query and the items in the set, and (2) comparing the query to the item stored in the pointed table slot to determine whether a match exists. Achieving the latter objective requires finding a minimal perfect hash function for S, which maps each item of S into one of n consecutive integer values in the table without any collisions. To achieve the former objective, the data structure should rapidly determine table slot addresses for queries by providing a simple, low memory and low-cost set membership query mechanism.

The exemplary LogLog hash-based TriBiCa data structure may achieve minimal perfect hashing by carefully partitioning the n items into equal-sized groups at each level so that at the end, all n items are uniquely partitioned (one item per group). To illustrate the above described LogLog hash TriBiCa data structure, a simple example is described with reference to FIG. 2 which illustrates a binary trie with $l=\lceil \log_2 (n)\rceil$ levels (where the root node is at level 0). The root node of this trie has all the n elements of S. To simplify the given example, assume n is a power of two. The n items of the root node at level 0 are arbitrarily partitioned into two equal-sized groups (n/2 each). One group is placed into the left child node and the other group is placed into the right child node. Assume that there exists such a partitioning algorithm that can arbitrarily partition n items provided in a node into two equal-sized groups (n/2 each), where one group is placed to the left child node and the other group to the right child node. Further assume that a method exists that will provide a query mechanism such that the correct group of a query item can be determined. (These methods are described later.) The operation of partitioning is then repeated in a recursive manner for each child node. More specifically, each child node will inherit precisely half of the items that belong to its parent. When a leaf node is reached, there will be two items in this node. The algorithm completes its partitioning by designating one of the items in each leaf node as the left child and the other as the right child.

The path traversed from the root to each leaf node followed by the direction of an item in that node (left or right) is unique and thus defines a unique ID for each element of the set S. These IDs are used to address the table where S is stored providing a minimal perfect hash function for S.

Figure 3:
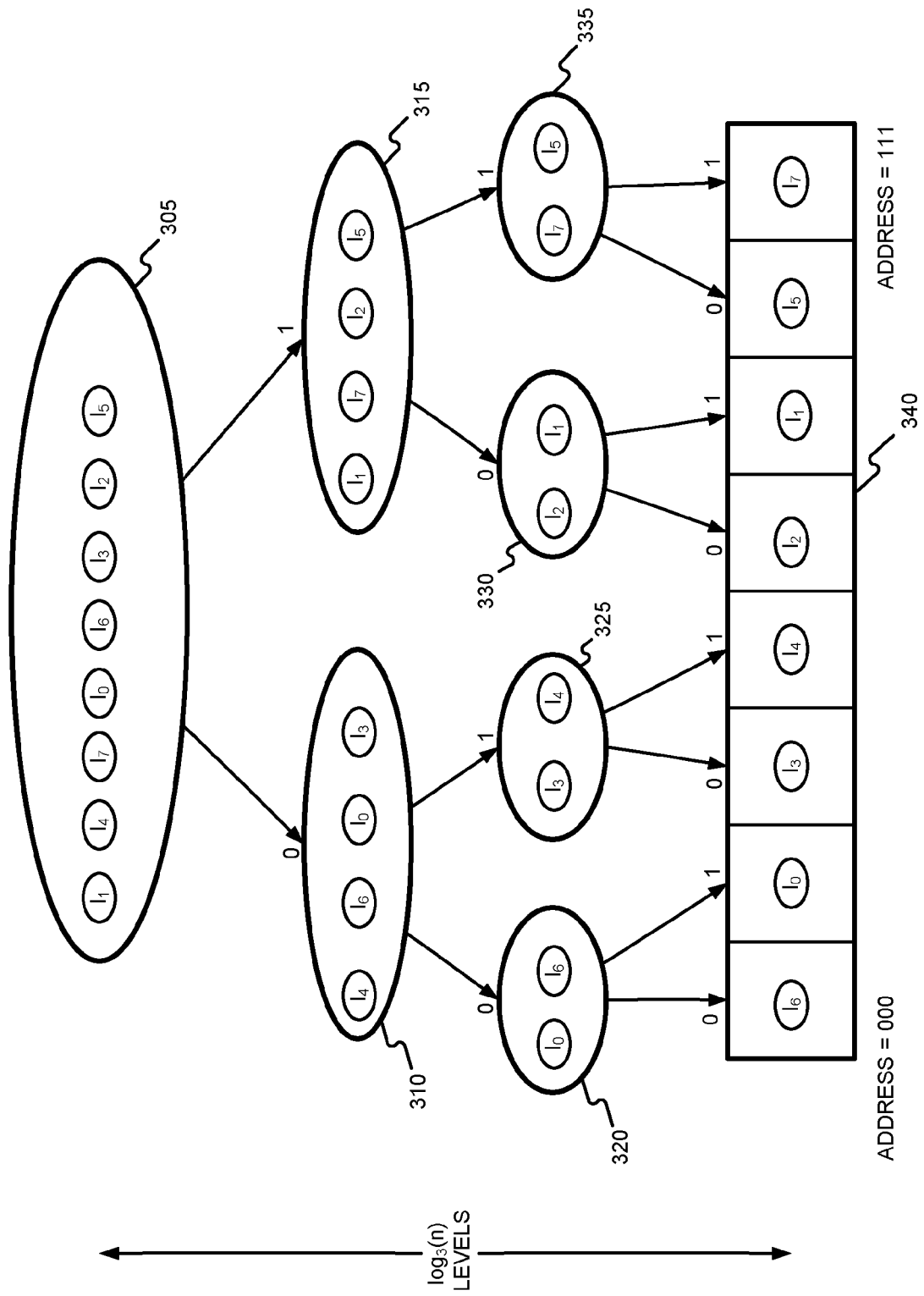
FIG. 3 illustrates a LogLog hash trie data structure (having eight items in its root node, wherein each item is minimal perfect hashed in a memory location), consistent with the present invention.

FIG. 3 is another example of an exemplary binary trie structure of LogLog hash TriBiCa, in which the root node 305 has eight (8) items ($I_0$-$I_7$). As illustrated in FIG. 3, at level 0 of the trie structure, these eight (8) items in the root node 305 will be partitioned by a partitioning algorithm into a left child node 310 inheriting four (4) items out of the eight (8) items in the root node 305 and a right child node 315 inheriting the remaining four (4) items in the root node. The above partitioning process is repeated at every level for every node of the trie structure until nodes containing only two items (i.e., nodes 320, 325, 330 and 335) have been partitioned, thus designating one of the two items as a left child and the other item as a right child. For example, node 320 has two items—namely $I_0$ and $I_6$—wherein item $I_6$ is designated as a left child and item $I_0$ is designated as a right child. At this point, each of the eight (8) items is stored into a memory location 340 at a defined address.

The address is defined by the path traversed from the root node to each leaf node and depends on the "direction" of an item in that node. For instance, starting from the root node 305 and defining a "0" bit to represent items grouped to the left and a "1" bit to represent items grouped to the right, item $I_0$ is first grouped to the left node 310, then the left node again 320, and finally the right node 320. Thus the address 001 designates the location at which the item $I_0$ is to be stored in the memory 340. As illustrated in FIG. 3 item $I_0$ is stored in the memory address 001 of memory 340.

Figure 4:
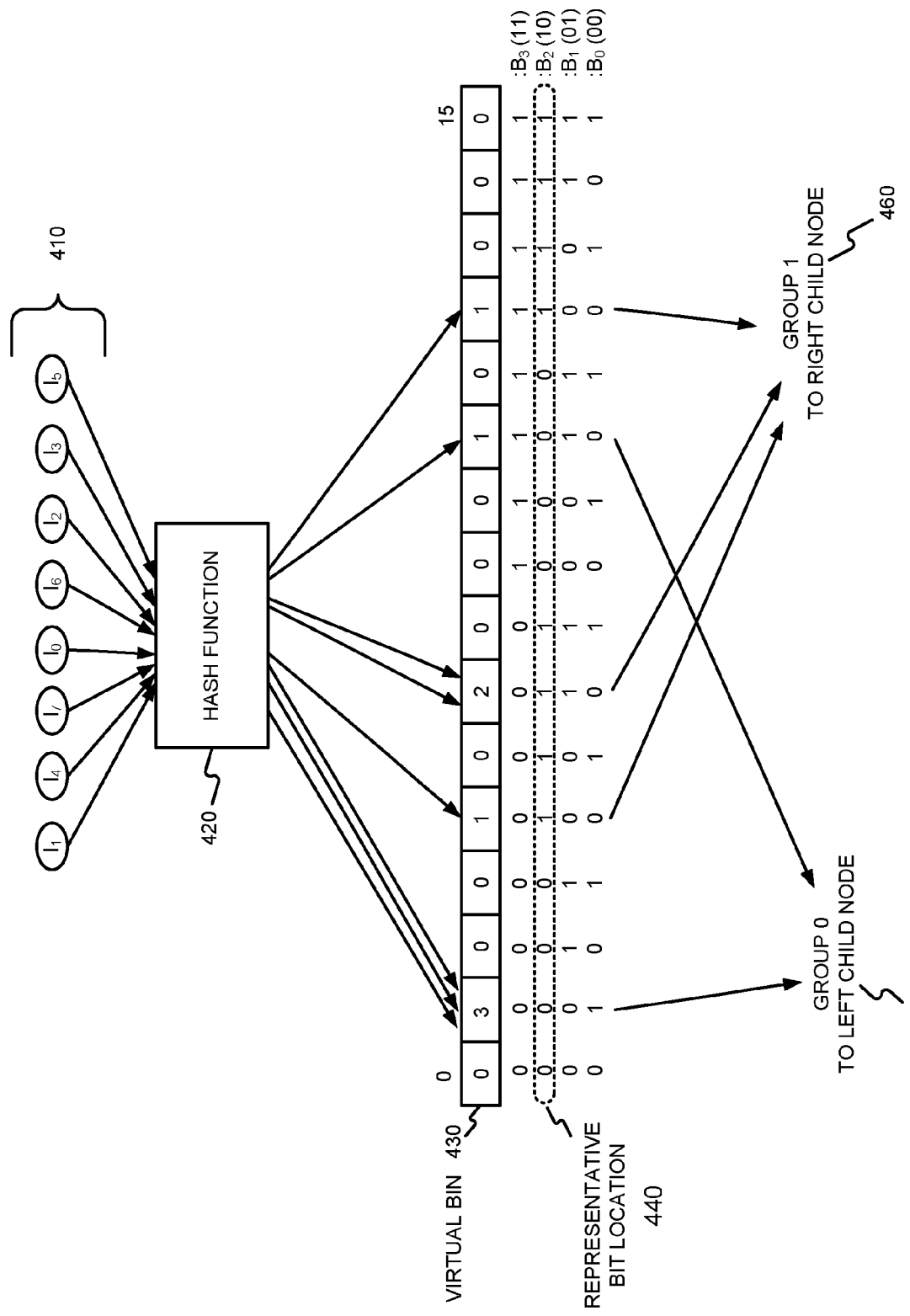
FIG. 4 illustrates components and the formation of an exemplary LogLog hash TriBiCa node based on the LogLog hash method consistent with the present invention.

An exemplary LogLog hash TriBiCa node is illustrated in FIG. 4. The exemplary LogLog hash TriBiCa node includes a hash function (e.g., a universal hash function 420), a virtual bin 430 and a representative bit location 440. Items are inserted into each node by hashing. As depicted in FIG. 4, eight items ($I_0$-$I_7$) 410 are hashed by the hashing function 420 and occupancy counts of the bins within the virtual bin 430 at bin locations corresponding to the hashed results are incremented. Specifically, each generated hash result of an item represents a 4-bit binary address defining a location of the virtual bin 430 and each bin holds a count of the total items hashed at its location. For instance, in the virtual bin 430 having 16 bin locations, three (3) of the eight (8) items 410 are hashed into bin location 1 (binary address: 0001) of the virtual bin 430, one (1) item is hashed into bin location 4 (binary address: 0100), two (2) items into bin location 6 (binary address: 0110), and so on until all items 410 are hashed into some bin location within the virtual bin 430. Note that more than one item can be hashed into the same bin location of the virtual bin 430. The bin occupancy count values of each bin are initially set to zero and are incremented accordingly every time an item is hashed into their bin locations.

An exemplary LogLog hash TriBiCa node also includes a representative bit location 440 which corresponds to one of the 4 bit locations (from least significant bit $B_0$(00) to most significant bit $B_3$(11)) of the 4-bit binary addresses generated by the hash result. At each bit location a bit location count may be determined wherein a bit location count is a summation of the number of bits having the bit value of "1" at the bit location of all of the generated 4-bit binary addresses. The representative bit location is a bit location selected such that its bit location count has a value equal to half the number of all the generated binary addresses. Hence, in FIG. 4 the representative bit location is a bit location selected such that its bit location count is 4. By examining the bit location count at each bit location $B_0$(00) to $B_3$(11) of all the 4-bit binary addresses generated by the hash results, it is determined that $B_2$(10) may serve as a representative bit location. The following table is an example illustrating the 4-bit binary addresses generated by hashing the items 410, the bit location counts and the selected representative bit location 440.

TABLE 1

| | $B_3$ (11) | $B_2$ (10) | $B_1$ (01) | $B_0$ (00) |
|---|---|---|---|---|
| | 0 | 0 | 0 | 1 |
| | 0 | 0 | 0 | 1 |
| | 0 | 0 | 0 | 1 |
| | 0 | 1 | 0 | 0 |
| | 0 | 1 | 1 | 0 |
| | 0 | 1 | 1 | 0 |
| | 1 | 0 | 1 | 0 |
| | 1 | 1 | 0 | 0 |
| Bit location counts: (count 1s) | 2 | 4 | 3 | 3 |

As seen from Table 1 above, the representative bit location is selected as bit location $B_2$(10) since it has a bit location count of 4 which is half the number of the generated 4-bit binary addresses (or items 410).

In effect, the representative bit location 440 may partition the items 410 in a left group and a right group, where hashed items having a bit value of "1" at the representative bit location are grouped to the right 460 and hashed items having a bit value of "0" at the representative bit location are grouped to the left 450. For example, as illustrated in FIG. 4, the representative bit location is $B_2$(10). Accordingly, the three (3) items hashed into bin location 1 (0001) and the one (1) item hashed into bin location 10 (1010) as shown in the virtual bin 430 have a bit value of "0" at the representative bit location and are sent to the left child node. The rest of the items hashed into bin locations 4, 6 and 12 as shown in the virtual bin 430 have a bit value of "1" at the representative bit location and are sent to the right child node. Note that each child node inherits half of the items 410 inserted/hashed into the node. The above process of inserting items into a node and partitioning takes place at every level and every node within a LogLog hash TriBiCa trie structure. (Note that the representative bit location and partitioning process may be determined by counting and using 0s instead of 1s)

§4.2 Methods for Generating Exemplary Data Structure

§4.2.1 LogLog Concept in a TriBiCa Trie Structure

In this section another LogLog hash TriBiCa trie structure is presented. Note that "keys" or "items" are used interchangeably and are meant to have the same meaning in the following paragraphs for purposes of explanation and illustration.

FIGS. 5A and 5B show an example of how the LogLog Hash scheme achieves equal partitioning of a set of n=4 ($K_n$: $K_1$, ... $K_4$) keys into two equal-sized subsets of two keys each, using the representative bit. All four (4) keys are hashed, using universal hash function $h_{u1}$ 510 in FIG. 5A and $h_{u2}$ 510' in FIG. 5B, into the virtual bins (m) 520 and 520'. In this example, the hash result (location of the virtual bin (m) 520 and 520') can be between 0 and 7, ("000" ... "111" in binary representation). Out of these $\log_2(m)$=3 bits, the method successfully finds a representative bit for this partitioning using $h_{u1}$ in FIG. 5A. The bit location $b_1$ 520 in FIG. 5A is a representative bit in the example, since for half of the keys ($K_1$ and $K_3$) $b_1$ is "0", and for the remaining half ($K_2$ and $K_4$) $b_1$ is "1". In contrast, FIG. 5B depicts a non-success case as none of bit locations ($b_2$, $b_1$, $b_0$) contains an equal number of zeros and ones. It is shown in §4.5 that the failure case is unlikely to happen. However, even if such a failure case occurs while "building" a LogLog hash TriBiCa trie structure, it can be readily overcome by simply selecting a new hash function permitting the successful determination of a representative bit for partitioning.

§4.2.2 Exemplary Method for Generating an Exemplary Log-Log Hash-Based Trie Data Structure FIG. 6, which includes FIGS. 6A and 6B, is a flow diagram of an exemplary method 600 which may be used to generate a hierarchical data structure associated with a plurality of arbitrary-length bit strings, in a manner consistent with the present invention. As shown, for each of the plurality of arbitrary-length bit strings within a group (loop 605-615), the arbitrary-length bit string is hashed using a selected hash function from a plurality of hash functions to generate a hash value representing an N-bit binary address defining a location of a virtual bin. (Block 610) Next, for each of the N bit locations (loop 620-630), the method 600 may determine a bit location count of all of the generated N-bit binary addresses. (Block 625) After act 625 is repeated for each of the N bit locations, the method 600 may determine a representative bit location corresponding to one of the N bit locations. (Block 635) Then, the method 600 may store an indication of the hash function used and the determined representative bit location. (Block 640) Thereafter, for each of the plurality of arbitrary-length bit strings, the method 600 may assign the arbitrary-length bit string to one of a first group and a second group using a bit value at the representative bit location of its hash value, wherein the arbitrary-length bit string is assigned to a first group if the bit value is of a first bit value and a second group if the bit value is of a second bit value. (Block 645)

As indicated by conditional block 650, if any of the groups has more than one assigned arbitrary-length bit string, the method 600 branches back to block 605 (via node B) and steps 605-650 are repeated for those groups having more than one assigned arbitrary-length bit string. Otherwise, if any of the groups does not have more than one assigned arbitrary-length bit string, the method 600 continues to block 655. Subsequently, for each of the plurality of arbitrary-length bit strings, the arbitrary-length bit string (or a pointer to the arbitrary-length bit string) is stored in a memory location defined by a concatenation of the bit values at the representative bit locations. (Block 655) The method 600 is then left. (Node 660)

Referring back to block 610, in at least some embodiments consistent with the present invention, a hash function is selected from a universal hash function family. Each arbitrary-length bit string within a group is hashed using the selected hash function. The result of the hash represents an N-bit binary address corresponding to a location of a virtual bin associated with the group.

Referring back to block 625, in at least some embodiments consistent with the present invention, the method 600 may determine a bit location count for each of the N bit locations of all of the hash generated N-bit binary addresses within a group. The bit location count at a selected bit location (from the N bit locations) is simply a summation of the number of bits having a first bit value at the selected bit location of all of the generated n-bit binary addresses.

Referring back to blocks 635, 640 and 645, in at least some embodiments consistent with the present invention, the method 600 may determine a representative bit location corresponding to one of the N bit locations. The representative bit location is a bit location whose bit count has a value equal to half the number of all of the generated n-bit binary address.

As can be appreciated from the foregoing, the representative bit location is used to attempt to partition the number of arbitrary-length bit strings within a group into two other equal sized groups. Hence, referring back to block 645, the method 600 may assign an arbitrary-length bit string to one of a first group and a second group using a bit value at the representative bit location of its hash value. The arbitrary-length bit strings are assigned to a first group if their bit values at the representative bit location are of a first bit value and a second group if their bit values at the representative bit location are of a second bit value. A concatenation of one or more of the bit values at the representative bit locations defines an address of the memory location storing the arbitrary-length bit string (or a pointer to the arbitrary-length bit string).

The hierarchical data structure generated by the method 600 of FIG. 6 may be a K-ary trie, where K is a whole number greater than or equal to 2. The hierarchical data structure provides a minimal perfect hash function regardless of the value of K. In at least some embodiments consistent with the present invention, K is an integer power of 2 (e.g., a binary trie). As expected, in such embodiments, the hierarchical data structure provides a minimal perfect hash function.

A data structure generated by the exemplary method 600 of FIG. 6 may be used to determine quickly whether an arbitrary-length bit string matches (or might match) one of a large number of known arbitrary-length bit strings. This characteristic makes such a data structure useful, for example, in communications network security. Specifically, this characteristic makes such a data structure useful to determine whether an input arbitrary-length bit string matches one of a number of known network intrusion signatures quickly. As another example, this characteristic also makes such a data structure useful to determine whether an input arbitrary-length bit string matches one of a number of known nucleotide sequences, such as known DNA and/or RNA sequences.

Details of exemplary embodiments for performing the method 600 of FIG. 6 in a manner consistent with the present invention are described below.

As can be appreciated from the foregoing, the method 600 may be used to produce computer-readable data structures stored on a computer-readable storage. The data structures may include an addressable memory and a hierarchical data structure. Specifically, the memory may store, for each of a plurality of known arbitrary-length bit strings, the known arbitrary-length bit string (or a pointer to the known arbitrary-length bit string) in an addressed location. Regarding the hierarchical data structure, a hash of one of the plurality of known arbitrary-length bit strings at each level of the hierarchical data structure may define whether it is assigned to a first group or a second group depending on the bit value at the representative bit location and ultimately whether the bit value at the representative bit location is of a first bit value or of a second bit value, and such that a concatenation of one or more of a first bit and a second bit starting at the assigned first bit or second bit at each level of the hierarchical data structure defines an address of the memory location storing the arbitrary-length bit string (or a pointer to the arbitrary-length bit string).

Recall that FIG. 5A illustrates an exemplary LogLog hash TriBiCa node. As discussed earlier, each node may include an indication of a hash function, a representative bit location, and a virtual bin. Note that a virtual bin need not be stored in a hierarchical data structure of a LogLog hash TriBiCa trie. Thus, each node in a hierarchical data structure of a LogLog hash TriBiCa trie only needs to store an indication of a hash function 510 used and a representative bit location 530.

The virtual bin 520 indicates the location (hash result) of a hashed key as well as the number of keys (occupancy count) hashed at each location. The representative bit location simply partitions the keys into two equal sized groups. Keys whose hash values have a bit value of "0" at the representative bit location are inherited by a left child node and keys whose hash values have a bit value of "1" at the representative bit location are inherited by a right child node. The node illustrated in FIG. 5A has a representative bit location of $b_1$ 530 and partitions keys $K_1$ and $K_3$, to a left child node and keys $K_2$ and $K_4$ to a right node. To insert a key into a node, the key is simply hashed with a hash function, and the bit value of the hash result at the representative bit location will show which child (left=0 or right=1) node inherits this particular key.

Given the data structure discussed earlier as well as the structure of an exemplary LogLog hash TriBiCa node, an example illustrating querying of an exemplary LogLog hash-based TriBiCa data structure is provided. FIG. 7 illustrates an exemplary LogLog hash TriBiCa trie with three (3) levels and eight (8) items ($I_1$-$I_8$). Each node has an indication of a hash function and a representative bit location stored. These items are first hashed to the root node. Half of the items in the root node ($I_1$, $I_2$, $I_4$ and $I_7$) are inherited by the left child since items $I_1$, $I_2$, $I_4$ and $I_7$ have hash values whose bit value at the representative bit location 715 is "0". The rest of the items ($I_3$, $I_5$, $I_6$ and $I_8$) are inherited by the right child node since items $I_3$, $I_5$, $I_6$ and $I_8$ have hash values whose bit value at the representative bit location 715 is "1".

The same operation is repeated in the child nodes. For example, in virtual bin 730, $I_2$ first goes to the right child node ($H_i(I_2)$=111, $B_0$(00)) and then at virtual bin 765, to the right child node again ($H_i(I_2)$=10, $B_1$(01)). The path traversed is encoded by the bit values at the representative bit locations (left=0, right=1) and determines the address of the item in the table 780.

A partitioning method determines the representative bit locations at each node of every level by using the hash results representing binary addresses defining virtual bin locations and the bit location count of all the generated binary addresses for each bit location.

When n is not an integer power of two, the binary trie will not be balanced and the partitioning might be left-aligned. (That is, nodes at level l might be filled from left to right with $2^{\lceil log_2(n) \rceil - l}$ items as long as there are enough items left.) The remainder of the items are put into the next node and the rest of the nodes (and their children) are removed. Optionally, LogLog hash TriBiCa can be designed as an arbitrary K-ary trie instead of specifically a binary trie, where each node has K children (K may differ between levels).

Once all items from an item set S are hashed into LogLog hash-based TriBiCa, the LogLog hash-based TriBiCa is ready for membership queries. The input is first hashed to the root node using the indicated hash function 705. The corresponding bit value at the representative bit location of the hash value at the current node 710 will indicate the child node to be branched to (bit value 0 or 1; left=0, right=1). Continuing in a similar manner, the trie is traversed until the leaf node is reached. The bit values at the representative bit locations based on the traversed path are used as an address to the table/memory to retrieve the item. Then the input will be compared with this item for a final membership decision.

§4.2.2.1 Partitioning to Determine a Representative Bit Location

An exemplary partitioning method is described which achieves minimal perfect hashing. For the exemplary partitioning method, the hash results which represent N-bit binary addresses of every item are required. Such information is illustrated in FIG. 5A.

The exemplary partitioning method is straightforward. For each node (associated with a virtual bin) to be partitioned, the bit location count for each of the n bit locations of all of the generated N-bit binary addresses is determined. The "bit location count" of a bit location is a summation of the number of bits having a bit value of "1" ("0" can also be used instead) at the bit location of all of the generated N-bit binary addresses (that is, hash values). Subsequently a representative bit location is selected, from amongst the n bit locations, that has a value equal to half the number of all of the generated n-bit binary addresses. If such a representative bit location is not possible to determine for a given node, then a new hash function for that node can be tried, and partitioning of this node is attempted again.

Presented below is pseudo-code for partitioning items/keys in a LogLog hash TriBiCa node:

The method first calculates a hash function for each key and stores the results. The function updateBit-Counts counts the number of ones for all bit locations and returns the value. The method then searches for each bit location based on updateBitCounts results to determine whether a representative bit exists for the particular hash result in this set of keys. If so, the method returns the location of the representative bit; otherwise, it returns null. The method has a worst-case run time of $O(n \cdot log_2(log_2(m)))$ to determine whether a representative bit exists or not for a node using one hash function. If no representative bit is found (null as the return value), the operation is repeated with another hash function.

```
1: LogLogHash (S, h_u, A )
2: // S is a set of n keys (K_1 ...K_n)
3: // h is a universal hash function with range [0,m − 1]
4: // A is an array of m bins
5: // l = log_2(log_2(m))
```

```
6: // L is an array of l counters
7:
8: // Programming
9: for i = 1 to n do
10:     insert K_i to A[h(K_i)]
11:     updateBitCounts(L, l, A[h(K_i)])
12: end for
13: // Determine the representative bit
14: for j = 0 to l − 1 do
15:     if L[j] = n/2 then
16:         return (j)
17:     end if
18: end for
19: return (null) // No representative bit, return null
20:
21: updateBitCounts (L, l, location)
22: for j = 0 to l ; 1 do
23:     if location[j] = 1 then
24:         L[j]++
25:     end if
26: end for
27: return (L[ ])
```

As an example, considering FIG. 5A, there are a total of four (4) keys in the node that need to be partitioned in half. As discussed above, the method may start adding "1"s at each of the bit locations ($b_2$, $b_1$ and $b_0$) of the all the binary addresses generated by the hash results. At bit location $b_0$ the number of "1"s is 3 so $b_0$ cannot be used as a representative bit location. (See 530.) At bit location $b_1$ the number of "1"s is 2 so $b_1$ can be used as a representative bit location since it may partition the keys in half. (See 530.) Thus, as illustrated in FIG. 5A, the representative bit location is set to $b_l$ 530. Therefore, keys $K_1$ and $K_3$ are grouped to the left child node and keys $K_2$ and $K_4$ are grouped to the right child node.

§4.3 Intrusion Detection Using the Exemplary Data Structures

§4.3.1 Exemplary Intrusion Detection Methods

FIG. 8 is a flow diagram of an exemplary method 800 for detecting whether an arbitrary-length bit string input matches one of a plurality of known arbitrary-length bit strings, in a manner consistent with the present invention. The method 800 accepts a hierarchical data structure, wherein each level of the hierarchical data structure includes one or more nodes, each node associated with an indication of a hash function and a representative bit location. (Block 810) The method 800 also accepts memory storing, for each of the plurality of known arbitrary-length bit strings, the known arbitrary-length bit string (or a pointer to the known arbitrary-length bit string), in an addressed location. (Block 820)

The exemplary method 800 interrogates the hierarchical data structure using hashes of the input arbitrary-length bit string, the indicated hash functions and the bit values at the representative bit location to determine an address of the memory. (Block 830) Next, the method 800 may read the known arbitrary-length bit string (or a pointer thereto) from the memory at the determined address. (Block 840) Finally, the method 800 may compare the input arbitrary-length bit string and the known arbitrary-length bit string to determine whether or not a match exists. (Block 850) The method 800 is then left. (Node 860) Thus, the method 800 can accept an arbitrary length bit string and output a match result (e.g., no match or matches a particular bit string).

The hierarchical data structure used by the method 800 of FIG. 8 may be a K-ary trie, where K is a whole number greater than or equal to 2. The hierarchical data structure provides a minimal perfect hash function regardless of the value of K. In at least some embodiments consistent with the present invention, K is an integer power of 2 (e.g., a binary trie). As expected, in such embodiments, the hierarchical data structure provides a minimal perfect hash function.

The method 800 of FIG. 8 may be used to determine quickly whether an arbitrary-length bit string matches (or might match) one of a large number of known arbitrary-length bit strings. This characteristic makes such a method useful, for example, in communications network security. Specifically, the method 800 may be used to determine whether an input arbitrary-length bit string matches one of a number of known network intrusion signatures. As another example, the method 800 may be used to determine whether an input arbitrary-length bit string matches one of a number of known nucleotide sequences, such as known DNA and/or RNA sequences.

Details of exemplary embodiments for performing the method 800 of FIG. 8 in a manner consistent with the present invention are described below.

Like the method 800 of FIG. 8, FIG. 9, which includes FIGS. 9A and 9B, is a flow diagram of an exemplary method 900 for detecting whether an arbitrary-length bit string input matches one of a plurality of known arbitrary-length bit strings, in a manner consistent with the present invention. The method 900 accepts a hierarchical data structure, wherein each level of the hierarchical data structure includes one or more nodes, each node associated with an indication of a hash function and a representative bit location. (Block 905) The method 900 also accepts a memory storing, for each of the plurality of known arbitrary-length bit strings, the known arbitrary-length bit string (or a pointer to the known arbitrary-length bit string), in an addressed location. (Block 910)

The exemplary method 900 may interrogate all layers of the hierarchical data structure as indicated by loop 915-935. Specifically, a number of acts are performed for all layers of the hierarchical data structure, starting at a first level of the hierarchical data structure. (Block 915) More specifically, the arbitrary-length bit string input may be hashed using the indicated hash function to obtain an N-bit binary address. (Block 920) Next, the method 900 may obtain a bit value at the representative bit location of the N-bit binary value. (Block 925) Subsequently, the method 900 may concatenate the bit value obtained at the representative bit location with any previous bits by obtaining bit values at representative bit locations of any previous levels of the hierarchical data structure. (Block 930) Recall that the bit value at the representative bit location will also be used to determine the child node to further process the input arbitrary length bit string.

It is then determined whether there is another (next) level of the hierarchical data structure (that is, whether present level of the hierarchical data structure is not the last level). (Block 935) If so, the method 900 branches back to block 915 to process the next level of the hierarchical data structure. Referring again to block 935, if it is determined that there is not another level of the hierarchical data structure (that is, present level of the hierarchical data structure is the last level), then the method 900 continues to block 940. At block 940, the method 900 determines the address of the memory as the concatenation of the obtained bit values. Then, the method 900 reads the stored arbitrary-length bit string at the determined address of the memory. (Block 945) Subsequently, the method 900 compares the read arbitrary-length bit string to the arbitrary-length bit string input to determine whether a match exists (Block 950) before the method 900 is left (Node 955). Thus, the method 900 can accept an arbitrary length bit string and output a match result (e.g., no match or matches a particular bit string).

The hierarchical data structure used by the method 900 of FIGS. 9A and 9B may be a K-ary trie, where K is a whole number greater than or equal to 2. The hierarchical data structure provides a minimal perfect hash function regardless of the value of K. In at least some embodiments consistent with the present invention, K is an integer power of 2 (e.g., a binary trie). As expected, in such embodiments, the hierarchical data structure provides a minimal perfect hash function.

Referring back to block 940, the number of bits obtained may be a function of the trie structure. For example, in a binary trie, where each node has two (2) child nodes at a next hierarchical level, only one (1) bit need be obtained, since one (1) bit can be used to identify either of the two (2) child nodes. For a K-ary trie where K is three (3) or four (4), only two (2) bits need be obtained, since two (2) bits can be used to identify any one of three (3) or four (4) child nodes. For a K-ary trie where K is from five (5) to eight (8), only three (3) bits need be obtained, since three (3) bits can be used to identify any one of five (5) to eight (8) child nodes, and so on.

The method 900 may be used to determine quickly whether an arbitrary-length bit string matches (or might match) one of a large number of known arbitrary-length bit strings. This characteristic makes such a method useful, for example, in communications network security. Specifically, the method 900 may be used to determine whether an input arbitrary-length bit string matches one of a number of known network intrusion signatures quickly. As another example, the method 900 may be used to determine whether an input arbitrary-length bit string matches one of a number of known nucleotide sequences, such as known DNA and/or RNA sequences.

§4.3.2 Example Illustrating Detection Operations

FIG. 7 illustrates an exemplary LogLog TriBiCa trie structure with three (3) levels and eight (8) items members ($I_1$-$I_8$). Each node at each level is depicted with the hashed items and hash results, the hash function, and the representative bit location. Hence, FIG. 7 is a complete LogLog TriBiCa trie structure ready to be queried.

In FIG. 7, the query for $I_2$ depicted by a dotted line 785 passing through each level and provides bit values at the representative bit locations in queried nodes 705, 720 and 745. Specifically, following the dotted line 785, the query for $I_2$ at node 705 provides a bit value of "0" at the representative bit location since $H_f(I_2)$=0001 and $B_2(10)$, at node 720 the query for $I_2$ provides a bit value of "1" at the representative bit location since $H_f(I_2)$=111 and $B_0(00)$, and at node 745 the query for $I_2$ provides a bit value of "1" at the representative bit location since $H_f(I_2)$=10 and $B_1(01)$. Hence, by concatenating the bit values at the representative bit locations through the path (nodes 805, 820 and 845), the binary address 011 is obtained which encodes the location of the query item in the table/memory 780. Specifically, the address 011 (slot 3) of the table memory 780 is obtained. To complete the matching, the item at the address 011 (slot 3) is read from the table/memory 780 and compared with the query $I_2$. The read item at the address 011 (slot 3) is $I_2$ and as expected the comparison gives a positive match since item $I_2$ is a previously processed items ($I_1$-$I_8$).

Finally, the query for $I_9$ depicted by a dotted line 790 passing through the trie levels and provides bit values at the representative bit locations in queried nodes 705, 725 and 755. Specifically, following the dotted line 790, the query for $I_9$ at node 705 provides a bit value of "1" at the representative bit location since $H_f(I_9)$=1110 and $B_2(10)$, at node 725 the query for $I_9$ provides a bit value of "1" at the representative bit location since $H_f(I_9)$=011 and $B_0(00)$, and at node 755 the query for $I_9$ provides a bit value of "0" at the representative bit location since $H_f(I_9)$=10 and $B_0(00)$. Hence, by concatenating the bit values at the representative bit locations through the path (nodes 705, 725 and 755), the binary address 110 is obtained, which encodes the location of the query item in the table/memory 780. Specifically, the address 110 (slot 6) of the table memory 780 is obtained. To complete the matching check, the item at the address 110 (slot 6) is read from the table/memory 780 and compared with the query $I_9$. The read item in slot 6 is $I_3$ and therefore does not give a match since item $I_9$ is not one of the previously processed items ($I_1$-$I_8$).

§4.4 Exemplary Apparatus

FIG. 10 is high-level block diagram of a machine 1000 that may perform one or more of the processes described above, and/or store information used and/or generated by such processes. The machine 1000 basically includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1020 and/or may be received from an external source via one or more input interface units 1030.

In one embodiment, the machine 1000 may be one or more conventional personal computers, servers, or routers. In this case, the processing units 1010 may be one or more microprocessors. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1032, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1010 through an appropriate interface 1030 coupled to the system bus 1040. The output devices 1034 may include a monitor or other type of display device, which may also be connected to the system bus 1040 via an appropriate interface. In addition to (or instead of) the monitor, the personal computer may include other (peripheral) output devices (not shown), such as speakers and printers for example.

Following the data structure, a hardware architecture is presented that tailors this data structure to the NIDPS. The hardware architecture fits into a fraction of a modest FPGA without the need for any external memory. More specifically, using parallel engines, the architecture can provide speeds on the order of 10-Gbps throughput in the worst case on a Xilinx Virtex II Pro FPGA. If current state-of-the-art FPGAs are used, the proposed architecture can easily achieve DPI at speeds on the order of 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

Instead of, or in addition to, FPGAs, other hardware, such as ASICS for example, may be used to implement one or more components of various embodiments consistent with the present invention.

Thus, various aspects of embodiments consistent with the present invention may be implemented in hardware and/or software. For example, a LogLog hash-based TriBiCa data structure may be designed using software, and then provided on a hardware detector.

§4.5 Refinements and Extensions

Figure 2:
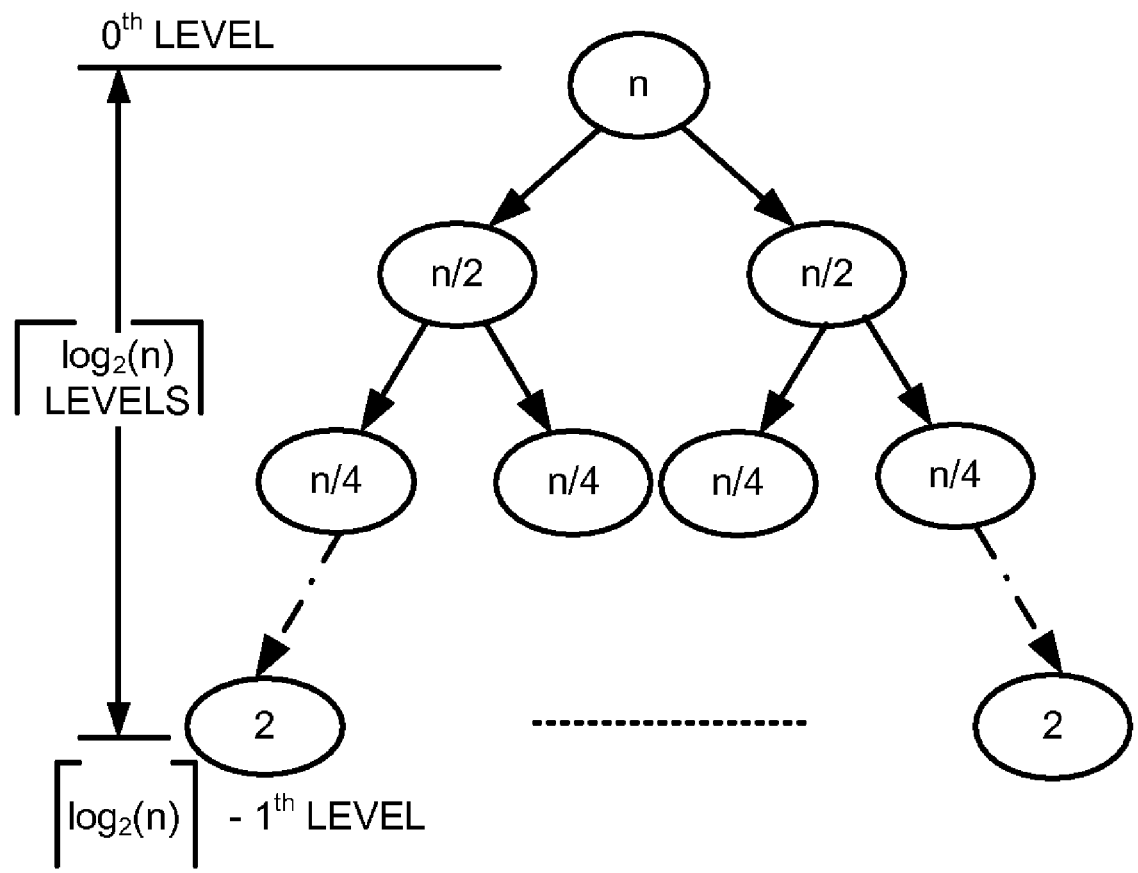
FIG. 2 illustrates a binary trie structure (with $l=\lceil \log_2(n) \rceil$ levels where the root node is at level 0), consistent with the present invention.

Although some of the foregoing examples were discussed in terms of LogLog hash TriBiCa data structures being binary trie structures wherein the number of items/keys (n) in the nodes is a power of two, as illustrated in FIGS. 1 and 2, such a case is not a requirement. For instance, FIG. 11 illustrates a case of a binary trie with an odd number of items n. When n is not an integer power of two, the binary trie will not be balanced and the partitioning might be left-aligned (that is, nodes at level l will be filled from left to right with $2^{\lceil log_2(n) \rceil - l}$ items as long as there are enough items left). The remainder of the items will be put into the next node and the rest of the nodes (and their children) will be removed (as illustrated in FIG. 11). Optionally, LogLog hash TriBiCa can be designed as a K-ary trie instead of a binary trie, where each node has K children (K may differ between levels). Note that when K is not a power of 2, an addresses determined by a path traversed along the K-ary trie may not be represented in binary but in another base (e.g., for K=3, a ternary number can represent the address; e.g., 120 represents 0×1+2×3+1×9=15)

Ultimately, the number of items (n) within any node of a LogLog hash TriBiCa data structures does not have to be a power of two and could be any whole number. Also, LogLog hash TriBiCa data structures do not have to be a binary trie (i.e., K is an integer power of 2) and generally could be design as a K-ary trie where K is a whole number greater than or equal to 2. Regardless of whether (n) or K are integer powers of 2 the LogLog hash TriBiCa scheme discussed above can provide a data structure that is an MPHF.

Although some of the foregoing examples were discussed in terms of "items" or "keys", such items may be arbitrary-length bit strings. Examples of arbitrary-length bit strings, include, for example, network intrusion signatures, nucleotide sequences, etc.

This section discusses the space complexity of LogLog Hash. To analyze the memory requirement of LogLog Hash, the space complexity of each level will be considered first. Each node reserves $\log_2(\log_2(m_v))$ bits of memory where $m_v$ is the number of virtual bins at each node. It is called virtual, since the nodes do not keep information of individual bins.

The size of the virtual bin need not be adjusted by the size of the keys in a node to maintain success probability with the LogLog Hash method.

$$M_{Ll} = 2^l \cdot \log_2(\log_2(m_v)) \quad (3)$$

From (3), the total memory for the LogLog Hash trie with log2(n) levels is $$M_L = \sum_{l=0}^{\log_2(n)-1} 2^l \cdot \log_2(\log_2(m_v)) = \log_2(\log_2(m_v)) \cdot (n-1) \quad (4)$$

From (4), the space complexity to the store representative bit for the entire trie is O(n). Another space requirement for the LogLog Hash method is space for storing hash functions, since the current scheme uses a pool of hash functions. Let $H_w$ be the size of the individual hash functions and $|H|$ be the total number of universal hash functions used in the system. Then, the complexity of storing hash functions is given as $O(n \cdot (\log_2(\lceil |H| \rceil) + H_w))$. In the worst case, $|H|=(n-1)$ different hash functions are required (In the worst case, all nodes use different hash functions.). Thus, worst-case complexity is $O(n \cdot (\log_2(n) + H_w))$.

§4.6 Conclusions

Embodiments consistent with the present invention provide a high-speed, scalable and easily updateable data structure used for determining whether or not an arbitrary length bit string matches a previously processed bit string. Specifically, the data structure is relatively small and its size may scale with the number of strings and the average string size in the set. In addition, the updates can be achieved without hardware modifications. The proposed data structure, called a LogLog hashed TriBiCa(Trie Bitmap Content Analyzer), provides minimal perfect hashing functionality while intrinsically supporting low-cost set-membership queries and while using string space efficiently. In other words, in some embodiments, it provides at most one match candidate in the signature set that is used to match the query.

Following the data structure, a hardware architecture is presented that tailors this data structure to the NIDPS.

An exemplary hardware architecture fits into a fraction of a modest FPGA without the need for any external memory More specifically, using parallel engines, the architecture can provide speeds on the order of 10-Gbps throughput in the worst case on a Xilinx Virtex II Pro FPGA. If current state-of-the-art FPGAs are used, the proposed architecture can easily achieve DPI at speeds on the order of 40 Gbps. The updates can be done through on-chip memory without any reconfiguration of the on-chip logic (i.e., without any hardware modification), allowing faster response to new attacks. Avoiding external memory access not only improves speed, but also allows parallel designs to fit into the same chip.

What is claimed is:

1. A method for generating a hierarchical data structure associated with a plurality of arbitrary-length bit strings, the method comprising:
   a) for each of the plurality of arbitrary-length bit strings within a group,
      hashing the arbitrary-length bit string, using a selected hash function from a plurality of hash functions, to generate a hash value representing an n-bit binary address defining a location of a virtual bin;
   b) for each of n bit locations, determining a bit location count of all of the generated n-bit binary addresses;
   c) determining a representative bit location corresponding to one of the n bit locations;
   d) storing an indication of the hash function and the representative bit location;
   e) for each of the plurality of arbitrary-length bit strings, assigning the arbitrary-length bit string to one of a first group and a second group using a bit value at the representative bit location of its hash value, wherein the arbitrary-length bit string is assigned to a first group if the bit value is of a fist bit value and a second group if the bit value is of a second bit value;
   f) for each of the groups, repeating acts (a) through (e) to generate two further sub-groups until each of the two further sub-groups has one or no assigned arbitrary-length bit string; and
   g) storing, for each of the plurality of arbitrary-length bit strings, the arbitrary-length bit string or a pointer thereto, in a memory location defined by a concatenation of the bit values.

2. The method of claim 1 wherein the bit location count at a bit location is a summation of the number of bits having a first bit value at the bit location of all of the generated n-bit binary addresses.

3. The method of claim 2 wherein a representative bit location is a bit location such that its bit location count has a value equal to half the number of all of the generated n-bit binary addresses.

4. The method of claim 3 wherein the hierarchical data structure provides a perfect hash function.

5. The method of claim 1 wherein a representative bit location is a bit location such that its bit location count has a value equal to half the number of all of the generated n-bit binary addresses.

6. The method of claim 1 wherein the hierarchical data structure is a K-ary trie, where K is a whole number greater than or equal to 2.

7. The method of claim 6 wherein the hierarchical data structure provides a minimal perfect hash function.

8. The method of claim 1 wherein the hierarchical data structure is a K-ary trie, where K is an integer power of 2 and wherein the hierarchical data structure provides a minimal perfect hash function.

9. The method of claim 1 wherein the hierarchical data structure is a binary trie.

10. The method of claim 9 wherein the hierarchical data structure provides a minimal perfect hash function.

11. The method of claim 1 wherein the arbitrary-length bit string is a communications network intrusion signature.

12. The method of claim 1 wherein the arbitrary-length bit string is a nucleotide sequence.

13. Apparatus for generating a hierarchical data structure associated with a plurality of arbitrary-length bit strings, the apparatus comprising:
   a) means, for each of the plurality of arbitrary-length bit strings within a group, for
      hashing the arbitrary-length bit string, using a selected hash function from a plurality of hash functions, to generate a hash value representing an n-bit binary address defining a location of a virtual bin;
   b) means, for each of n bit locations, for determining a bit location count of all of the generated n-bit binary addresses;
   c) means for determining a representative bit location corresponding to one of the n bit locations;
   d) means for storing an indication of the hash function and the representative bit location;
   e) means, for each of the plurality of arbitrary-length bit strings, for assigning the arbitrary-length bit string to one of a first group and a second group using a bit value at the representative bit location of its hash value, wherein the arbitrary-length bit string is assigned to a first group if the bit value is of a fist bit value and a second group if the bit value is of a second bit value;
   f) means, for each of the groups, for repeating acts (a) through (e) to generate two further sub-groups until each of the two further sub-groups has one or no assigned arbitrary-length bit string; and
   g) means for storing, for each of the plurality of arbitrary-length bit strings, the arbitrary-length bit string or a pointer thereto, in a memory location defined by a concatenation of the bit values.

14. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a representative bit location, the representative bit location partitioning a set of results of the hash function of at least some of the known arbitrary-length bit strings, the method comprising:
- a) interrogating the hierarchical data structure using hashes of the input arbitrary-length bit string, the indicated hash functions and the bit values at the representative bit locations to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists.

15. The method of claim 14 wherein the act of the interrogating includes, starting at a first level of the hierarchical data structure,
1) hashing the arbitrary length bit string using the indicated hash function to obtain an n-bit binary value;
2) obtaining a bit value at the representative bit location of the n-bit binary value;
3) concatenating the bit value obtained at the representative bit location with any previous, by obtaining bit values at representative bit locations of any previous levels of the hierarchical data structure;
4) determining whether the present level of the hierarchical data structure is a last level; and
5) if it was determined that the present level of the hierarchical data structure is not the last level, then
   A) repeating acts (1) through (4) at a next level of the hierarchical data structure, and
otherwise, if it was determined that present level of the hierarchical data structure is the last level, then
   A) determining the address of the memory as the concatenation of the obtained bit values.

16. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a representative bit location, the method comprising:
- a) interrogating the hierarchical data structure using hashes of the input arbitrary-length bit string, the indicated hash functions and the bit values at the representative bit locations to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists,
wherein the hierarchical data structure is a K-ary trie, where K is a whole number greater than or equal to 2.

17. The method of claim 16 wherein the hierarchical data structure provides a perfect hash function.

18. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a representative bit location, the method comprising:
- a) interrogating the hierarchical data structure using hashes of the input arbitrary-length bit string, the indicated hash functions and the bit values at the representative bit locations to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists,
wherein the hierarchical data structure is a K-ary trie, where K is an integer power of 2 and wherein the hierarchical data structure provides a minimal perfect hash function.

19. The method of claim 14 wherein the hierarchical data structure is a binary trie.

20. The method of claim 19 wherein the hierarchical data structure provides a minimal perfect hash function.

21. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a representative bit location, the method comprising:
- a) interrogating the hierarchical data structure using hashes of the input arbitrary-length bit string, the indicated hash functions and the bit values at the representative bit locations to determine an address of the memory;
- b) reading the known arbitrary-length bit string or a pointer thereto, from the memory at the determined address; and
- c) comparing the input arbitrary-length bit string and the known arbitrary-length bit string to determine whether or not a match exists,
wherein the arbitrary length bit string is a communications network intrusion signature.

22. A method for detecting whether an arbitrary-length bit string input matches one of a plurality of known arbitrary-length bit strings, using
- a memory storing, for each of the plurality of known arbitrary-length bit strings, the known arbitrary-length bit string or a pointer thereto, in an addressed location, and
- a hierarchical data structure, wherein each level of the hierarchical data structure includes one or more nodes, each node associated with an indication of a hash function and a representative bit location, the method comprising:
- a) interrogating the hierarchical data structure using hashes of the input arbitrary-length bit string, the indicated hash functions and the bit values at the representative bit locations to determine an address of the memory;

b) reading the known arbitrary-length bit string or a pointer thereto, from the memory at the determined address; and c) comparing the input arbitrary-length bit string and the known arbitrary-length bit string to determine whether or not a match exists, wherein the arbitrary length bit string is a nucleotide sequence.

23. Apparatus for detecting whether an arbitrary-length bit string input matches one of a plurality of known arbitrary-length bit strings, the apparatus comprising:

a) a memory storing, for each of the plurality of known arbitrary-length bit strings, the known arbitrary-length bit string or a pointer thereto, in an addressed location;

b) a hierarchical data structure, wherein each level of the hierarchical data structure includes one or more nodes, each node associated with an indication of a hash function and a representative bit location, the representative bit location partitioning a set of results of the hash function of at least some of the known arbitrary-length bit strings;

c) means for interrogating the hierarchical data structure using hashes of the input arbitrary-length bit string, the indicated hash functions and the bit values at the representative bit locations to determine an address of the memory;

d) means for reading the known arbitrary-length bit string or a pointer thereto, from the memory at the determined address; and e) means for comparing the input arbitrary-length bit string and the known arbitrary-length bit string to determine whether or not a match exists.

* * * * *